(12) United States Patent
Xu et al.

(10) Patent No.: US 10,638,433 B2
(45) Date of Patent: *Apr. 28, 2020

(54) POWER CONTROL METHOD AND TERMINAL EQUIPMENT

(71) Applicant: FUJITSU LIMITED, Kawasaki-shi, Kanagawa (JP)

(72) Inventors: Haibo Xu, Beijing (CN); Yi Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,985

(22) Filed: Sep. 7, 2018

(65) Prior Publication Data
US 2019/0007911 A1    Jan. 3, 2019

Related U.S. Application Data

(63) Continuation of application No. 15/387,126, filed on Dec. 21, 2016, now Pat. No. 10,098,077, which is a
(Continued)

(51) Int. Cl.
*H04W 52/36* (2009.01)
*H04W 52/14* (2009.01)
(Continued)

(52) U.S. Cl.
CPC ....... *H04W 52/367* (2013.01); *H04W 52/146* (2013.01); *H04W 52/281* (2013.01);
(Continued)

(58) Field of Classification Search
CPC ............. H04W 52/146; H04W 52/281; H04W 52/367; H04W 52/325; H04W 52/346; H04W 52/50; H04W 72/0833
See application file for complete search history.

(56) References Cited

U.S. PATENT DOCUMENTS

2009/0181691 A1   7/2009 Kotecha et al.
2011/0081936 A1*  4/2011 Haim ................. H04W 52/367
                                                     455/522
(Continued)

FOREIGN PATENT DOCUMENTS

CN    101615928      12/2009
CN    101877906 A    11/2010
(Continued)

OTHER PUBLICATIONS

First Notification of Office Action issued by the China National Intellectual Property Administration for corresponding Chinese Patent Application No. 201610771290.9, dated Feb. 3, 2019, with an English translation.
(Continued)

*Primary Examiner* — Gary Mui
(74) *Attorney, Agent, or Firm* — Myers Wolin, LLC

(57) ABSTRACT

A user equipment includes: a transmitter configured to transmit uplink signals; and a processor circuit coupled with the transmitter, the processor circuit configured to: drop a Sounding Reference Signal (SRS) transmission when a total transmission power exceeds maximum output power of the user equipment and the user equipment needs to transmit a Physical Random Access Channel (PRACH) signal in a secondary serving cell in parallel with the SRS transmission in a symbol on a subframe of a different serving cell; and adjust transmission power of a Physical Uplink Shared Channel (PUSCH) signal until an adjusted total transmission power is less than or equal to the maximum output power of the user equipment when the user equipment needs to transmit a PRACH signal in a secondary serving cell in parallel with a PUSCH signal in a different serving cell within a symbol.

4 Claims, 13 Drawing Sheets

601 — transmitting only a PRACH signal or only an SRS signal by terminal equipment within an OFDM symbol when the terminal equipment needs to transmit the PRACH signal in an SCell and transmit the SRS signal in other serving cell(s) within the same OFDM symbol 602 — adjusting, by the terminal equipment, transmission power of a PRACH signal and/or a physical uplink channel signal according to a predefined priority order of the PRACH signal and the physical uplink channel signal if total transmission power is greater than maximum output power of the terminal equipment, when the terminal equipment needs to transmit the PRACH signal in an SCell and transmit the physical uplink channel signal in other serving cell(s) within the same subframe

Related U.S. Application Data continuation of application No. 15/044,427, filed on Feb. 16, 2016, now Pat. No. 9,532,321, which is a continuation of application No. 14/162,034, filed on Jan. 23, 2014, now Pat. No. 9,307,503, which is a continuation of application No. PCT/CN2011/077789, filed on Jul. 29, 2011.

(51) Int. Cl.

| | | |
|---|---|---|
| *H04W 52/32* | (2009.01) | |
| *H04W 52/34* | (2009.01) | |
| *H04W 52/50* | (2009.01) | |
| *H04W 52/28* | (2009.01) | |
| *H04W 74/08* | (2009.01) | |

(52) U.S. Cl.
CPC ....... *H04W 52/325* (2013.01); *H04W 52/346* (2013.01); *H04W 52/50* (2013.01); *H04W 74/0833* (2013.01); *Y02D 70/00* (2018.01); *Y02D 70/1264* (2018.01)

(56) References Cited

U.S. PATENT DOCUMENTS

| | | | |
|---|---|---|---|
| 2011/0268028 A1* | 11/2011 | Stern-Berkowitz | H04L 5/0048 370/328 |
| 2011/0275335 A1* | 11/2011 | Luo | H04W 52/281 455/127.1 |
| 2011/0292826 A1 | 12/2011 | Ann et al. | |
| 2012/0039273 A1* | 2/2012 | Nam | H04L 5/0005 370/329 |
| 2012/0127931 A1 | 5/2012 | Gaal et al. | |
| 2012/0218987 A1 | 8/2012 | Zhao et al. | |
| 2012/0300715 A1* | 11/2012 | Pelletier | H04W 56/0005 370/329 |
| 2013/0010720 A1* | 1/2013 | Lohr | H04L 1/0026 370/329 |
| 2013/0058315 A1* | 3/2013 | Feuersanger | H04W 52/281 370/336 |
| 2013/0148614 A1* | 6/2013 | Noh | H04L 5/001 370/329 |
| 2014/0010182 A1* | 1/2014 | Chunli | H04L 5/0048 370/329 |
| 2015/0223178 A1* | 8/2015 | Pietraski | H04L 5/001 370/252 |

FOREIGN PATENT DOCUMENTS

| | | |
|---|---|---|
| CN | 102014476 A | 4/2011 |
| CN | 102037774 | 4/2011 |
| CN | 102106107 | 6/2011 |
| JP | 2013-531427 | 8/2013 |
| KR | 10-2010-0088083 A | 8/2010 |
| KR | 10-2010-0116519 A | 11/2010 |
| WO | 2010/121708 A1 | 10/2010 |
| WO | 2011/150265 | 12/2011 |

OTHER PUBLICATIONS

Search Report issued by the China National Intellectual Property Administration for corresponding Chinese Patent Application No. 201610771290.9, dated Feb. 3, 2019, with an English translation.
International search report issued for corresponding international application No. PCT/CN2011/077789, dated May 3, 2012.
Extended European Search Report with Supplementary European Search Report and the European Search Opinion issued for corresponding European Patent Application No. 11870371.9, dated Nov. 12, 2014.
3GPP TS 36.213 V10.2.0, "3rd Generation Partnership Project; Technical Specification Group Radio Access Network; Evolved Universal Terrestrial Radio Access (E-UTRA); Physical layer procedures (Release 10)", Jun. 2011.
ETSI MCC, "Draft Report of 3GPP TSG RAN WG2 Meeting #73bis held in Shanghai, China Apr. 11-15, 2011", Agenda Item: 2.2, 3GPP TSG-RAN WG2 Meeting #74, R2-112661, Barcelona, Spain, May 9-13, 2011.
Fujitsu, "Summary of email discussion on simultaneous PUSCH/PUCCH/SRS", Agenda Item: 6.2.1, 3GPP TSG-RAN1 Meeting #63bis. R1-110464, Dublin, Ireland, Jan. 17-21, 2011.
Non-Final Office Action issued by the United States Patent & Trademark Office for corresponding U.S. Appl. No. 14/162,034, dated Sep. 3, 2015.
Notice of Reason for Rejection issued by the Japan Patent Office for corresponding Japanese Patent Application No. 2014-521905, dated Aug. 18, 2015, with an English translation.
Office Action issued by the European Patent Office for corresponding European Patent Application No. 11 870 371.9-1855, dated Jul. 10, 2015.
First Notification of Office Action issued by the State Intellectual Property Office of China for corresponding Chinese Patent Application No. 201180069494.3, dated Dec. 10, 2015, with an English translation.
Notice of Preliminary Rejection issued by the Korean Intellectual Property Office for corresponding Korean Patent Application No. 10-2014-7004057, dated Jan. 8, 2016, with English translation.
Extended European search report with the European search report or the partial European search report/ declaration of no search and the European search opinion issued by the European Patent Office for corresponding European Patent Application No. 16163599.0, dated May 11, 2016.
Non-Final Office Action issued by the United States Patent & Trademark Office for corresponding U.S. Appl. No. 15/044,427, electronically dated Jun. 23, 2016.
Communication pursuant to Article 94(3) EPC issued by the European Patent Office for corresponding European Patent Application No. 16 163 599.0-1875, dated Feb. 23, 2017.
Non-Final Office Action issued by the United States Patent & Trademark Office for corresponding U.S. Appl. No. 15/387,126, dated Feb. 5, 2018.

* cited by examiner

POWER CONTROL METHOD AND TERMINAL EQUIPMENT

CROSS-REFERENCE TO RELATED APPLICATIONS

This is a continuation of U.S. application Ser. No. 15/387,126, which was filed Dec. 21, 2016, which is a continuation of U.S. application Ser. No. 15/044,427, which was filed Feb. 16, 2016, now U.S. Pat. No. 9,532,321, issued Dec. 27, 2016, which is a continuation of U.S. application Ser. No. 14/162,034 which was filed Jan. 23, 2014, now U.S. Pat. No. 9,307,503, issued Apr. 5, 2016, which claims priority to International Application No. PCT/CN2011/077789, filed on Jul. 29, 2011, the contents of each are herein wholly incorporated by reference.

TECHNICAL FIELD

The present invention relates to the field of communications, and in particular to a power control method and terminal equipment in case of power of a terminal being limited.

BACKGROUND ART

In a long-term evolution (LTE) system, power control methods when terminal equipment transmits a physical uplink share channel (PUSCH), a physical uplink control channel (PUCCH), an uplink sounding reference signal (SRS) and a physical random access channel (PRACH) are defined (3GPP TS 36.213 v 8.6.0), wherein, a formula of power control of the PUSCH is:

$$P_{PUSCH}(i) = \min\{P_{MAX}, 10\log_{10}(M_{PUSCH}(i)) + P_{O\_PUSCH}(j) + \alpha(j) \cdot PL + \Delta_{TF}(i) + f(i)\} \text{ [dBm]} \quad (1);$$

a formula of power control of the PUCCH is:

$$P_{PUCCH}(i) = \min\{P_{MAX}, P_{0\_PUCCH} + PL + h(n_{CQI}, n_{HARQ}) + \Delta_{F\_PUCCH}(F) + g(i)\} \text{ [dBm]} \quad (2);$$

a formula of power control of the SRS is:

$$P_{SRS}(i) = \min\{P_{MAX}, P_{SRS\_OFFSET} + 10\log_{10}(M_{SRS}) + P_{O\_PUSCH}(j) + \alpha \cdot PL + f(i)\} \text{ [dBM]} \quad (3);$$

and a formula of power control of the PRACH is:

$$P_{PRACH} = \min\{P_{CMAX,c}(i), \text{PREAMBLE\_RECEIVED\_TARGET\_POWER} + PL_c\} \text{ [dBm]} \quad (4).$$

In the LTE system, the same terminal equipment does not transmit a PUSCH, a PUCCH and a PRACH in the same subframe at the same time. Meanwhile, the same terminal equipment does not transmit an SRS and a PUSCH, an SRS and a PUCCH, and an SRS and a PRACH, in the same orthogonal frequency division multiplexing (OFDM) symbol at the same time. And on the other hand, it can be seen from the formulae of power control of the PUSCH, PUCCH, PRACH and SRS that if the transmission power of the uplink signals exceeds the configured maximum output power (PCMAX) of the terminal equipment, that is, overflow of the output power of the terminal equipment occurs, the transmission power of the terminal equipment used in transmitting the uplink signals will be equal to the configured maximum output power (PCMAX) of the terminal equipment.

In Rel-10 of an LTE-Advanced (LTE-A) system, a carrier aggregation technology is used, and transmission power of uplink signals is independently controlled in each serving cell, with the power control methods being as follows:

power control of a PUSCH:

when only PUSCHs are transmitted in a serving cell c, the transmission power of the PUSCHs of the terminal equipment in an i-th subframe in the serving cell c is:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \quad (5)$$

[dBm]

when PUSCHs and PUCCHs are transmitted in the serving cell c, the transmission power of the PUSCHs of the terminal equipment in the i-th subframe in the serving cell c is:

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \quad (6)$$

[dBm]

power control of a PUCCH:

when PUCCHs are transmitted in the serving cell c, the transmission power of the PUCCHs of the terminal equipment in the i-th subframe in the serving cell c is:

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{T \times D}(F') + g(i) \end{Bmatrix} \quad (7)$$

[dBm]

power control of an SRS:

when SRSs are transmitted in the serving cell c, the transmission power of the SRSs of the terminal equipment in the i-th subframe in the serving cell c is:

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\} \text{[dBm]} \quad (8)$$

The method for controlling transmission power of a PRACH is the same as that of the LTE system, which are omitted herein.

As a carrier aggregation technology is used, when the terminal equipment is configured with multiple serving cells, there will appear in the same subframe, and multiple PUSCHs are transmitted at the same time (as shown in FIG. 1(a)), or PUSCHs and PUCCHs are transmitted at the same time (as shown in FIG. 1(b)), in different serving cells. And on the other hand, as the capability of the terminal equipment is enhanced, the terminal equipment is able to transmit PUSCHs and PUCCHs in the same subframe in a primary serving cell at the same time (as shown in FIG. 1(c)).

If the above case occurs, that is, the terminal equipment needs to transmit multiple PUSCHs, or the terminal equipment needs to transmit PUSCHs and PUCCHs, in the same subframe at the same time, a case will occur where the sum of transmission power of multiple PUSCHs is greater than the configured maximum output power of the terminal equipment, or the sum of transmission power of the PUSCHs and PUCCHs is greater than the configured maximum output power of the terminal equipment. In order to direct allocation of the transmission power of the terminal equipment in such a case, a power control method in case of transmission power of terminal equipment being limited is defined in standardization of the LTE-A system. In which, when multiple PUSCHs with no uplink control information (UCI) only need to be transmitted at the same time, the terminal equipment calculates first the transmission power needed by PUSCHs in each serving cell according to formula (5); and if the total transmission power obtained at this moment exceeds the maximum output power of the terminal equipment, the terminal equipment decreases the transmission power of each PUSCH by equivalent share, until that the total transmission power is less than or equal to the maximum output power of the terminal equipment is ensured;

when PUSCHs with no UCI and PUCCHs need to be transmitted at the same time, the terminal equipment calculates first the transmission power needed by the PUSCHs in a serving cell where only PUSCHs are transmitted according to formula (5), and calculates the transmission power needed by the PUSCHs and the PUCCHs in a serving cell where PUSCHs and PUCCHs are transmitted at the same time according to formulae (6) and (7); and if the total transmission power obtained at this moment exceeds the maximum output power of the terminal equipment, the terminal equipment first ensures that the transmission power of the PUCCHs is satisfied, and then decreases the transmission power in each PUSCH with no UCI by equivalent share, until that the total transmission power is less than or equal to the maximum output power of the terminal equipment is ensured;

when PUSCHs with no UCI and PUSCHs with UCI need to be transmitted at the same time, the terminal equipment calculates first the transmission power needed by the PUSCHs in each serving cell according to formula (5); and if the total transmission power obtained at this moment exceeds the maximum output power of the terminal equipment, the terminal equipment first ensures that the transmission power of the PUSCHs with UCI is satisfied, and then decreases the transmission power in each PUSCH with no UCI by equivalent share, until that the total transmission power is less than or equal to the maximum output power of the terminal equipment is ensured;

when PUCCHs, PUSCHs with no UCI and PUSCHs with UCI need to be transmitted at the same time, the terminal equipment calculates first the transmission power needed by the PUSCHs in a serving cell where only PUSCHs are transmitted according to formula (5), and calculates the transmission power needed by the PUSCHs and the PUCCHs in a serving cell where PUSCHs and PUCCHs are transmitted at the same time according to formulae (6) and (7); and if the total transmission power obtained at this moment exceeds the maximum output power of the terminal equipment, the terminal equipment first ensures that the transmission power of the PUCCHs is satisfied and secondly ensures that the transmission power of the PUSCHs with UCI is satisfied, and then decreases the transmission power in each PUSCH with no UCI by equivalent share, until that the total transmission power is less than or equal to the maximum output power of the terminal equipment is ensured.

In Rel-10 of the LTE-A system, when a terminal is configured with multiple serving cells, the terminal equipment uses the same uplink time advance value in transmitting uplink signals in all the serving cells, so as to ensure uplink synchronization. An initial value of the time advance is obtained by performing random access in a primary serving cell. Hence, in Rel-10, a base station configures a PRACH channel for the terminal equipment only in the primary serving cell (PCell), and the terminal equipment transmits PRACH signals only in the PCell. And at the same time, when the terminal equipment needs to transmit PRACH signals in the PCell, the terminal equipment does not transmit other uplink signals, including a PUSCH, a PUCCH and an SRS, in the PCell or other secondary serving cells (SCells).

In the implementation of the present invention, the inventors found that in Rel-11, as an uplink needs to support aggregation of carriers from different stations and an inter-band carrier aggregation technology, it cannot be ensured that all the SCells have uplink signal time advance value same as that of a PCell. In order to obtain time advance value in some SCells, the terminal equipment needs to perform random access in the SCells. Therefore, in Rel-11, the base station needs to configure PRACH channel in some SCells for the terminal equipment. And the terminal equipment also needs to transmit PRACH signals in the SCells. At this moment, besides the case occurring in Rel-10 where the terminal equipment needs to transmit multiple PUSCHs in the same subframe at the same time or the terminal equipment needs to transmit PUSCHs and PUCCHs in the same subframe at the same time, the terminal equipment may need to transmit PUSCHs and PRACHs at the same time, transmit PUCCHs and PRACHs at the same time, and transmit SRSs and PRACHs at the same time. Therefore, the occurrence of the following three scenarios will also lead to occurrence of a case where the sum of the transmission power of the terminal equipment is greater than the configured maximum output power of the terminal equipment:

scenario 1 (as shown in FIG. 2): the sum of the transmission power of the terminal equipment in transmitting PUXCHs (PUXCH refers to a PUSCH or a PUCCH) and PRACHs respectively in a PCell and a SCell at the same time is greater than the configured maximum output power of the terminal equipment;

scenario 2 (as shown in FIG. 3): the sum of the transmission power of the terminal equipment in transmitting SRSs and PRACHs respectively at the same time in a PCell and a SCell is greater than the configured maximum output power of the terminal equipment; and scenario 3 (as shown in FIG. 4): both of the sum of the transmission power of the terminal equipment in transmitting PUXCHs and PRACHs and the sum of the transmission power of the terminal equipment in transmitting SRSs and PRACHs respectively in a PCell and a SCell at the same time are greater than the configured maximum output power of the terminal equipment.

It can be seen that when the sum of the transmission power of the terminal equipment in transmitting PUSCHs and PRACHs in the same subframe at the same time is greater than the configured maximum output power of the terminal equipment, or the sum of the transmission power of the terminal equipment in transmitting PUCCHs and PRACHs in the same subframe at the same time is greater than the configured maximum output power of the terminal equipment, or the sum of the transmission power of the terminal equipment in transmitting SRSs and PRACHs in the same OFDM symbol at the same time is greater than the configured maximum output power of the terminal equipment, how to control the power in uplink transmission of signals by the terminal equipment is an urgent problem needing to be solved at the present.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide a power control method and terminal equipment in case of power of a terminal being limited, so as to solve a problem that the sum of the transmission power of the terminal equipment in transmitting SRSs and PRACHs in the same OFDM symbol at the same time is greater than the configured maximum output power of the terminal equipment, or to solve a problem that the sum of the transmission power of the terminal equipment in transmitting PRACHs and other physical uplink channel signals in the same subframe at the same time is greater than the configured maximum output power of the terminal equipment.

According to one aspect of the embodiments of the present invention, there is provided a power control method, including: dropping, by terminal equipment, an SRS signal in other serving cell(s) or puncturing symbols of a PRACH signal in a secondary serving cell within the same OFDM symbol as the SRS signal in the other serving cell(s), when the terminal equipment needs to transmit the PRACH signal in the secondary serving cell and transmit the uplink SRS signal in the other serving cell(s) within the same OFDM symbol.

Based on this method, when the terminal equipment needs to transmit the PRACH signal in the secondary serving cell and transmit a physical uplink channel signal in the other serving cell(s) within the same subframe, if total transmission power of the terminal equipment is greater than maximum output power of the terminal equipment, the terminal equipment adjusts transmission power of the PRACH signal and/or the physical uplink channel signal according to a predefined priority order of the PRACH signal and the physical uplink channel signal, until the adjusted total transmission power is less than or equal to the maximum output power of the terminal equipment.

According to another aspect of the embodiments of the present invention, there is provided a power control method, including: adjusting, by terminal equipment, transmission power of a PRACH signal and a SRS signal according to the priority orders of the PRACH signal and the SRS signal if total transmission power of the terminal equipment is greater than maximum output power of the terminal equipment, when the terminal equipment needs to transmit the PRACH signal in a secondary serving cell and transmit the uplink SRS signal in other serving cell(s) within the same OFDM symbol.

Based on this method, when the terminal equipment needs to transmit the PRACH signal in the secondary serving cell and transmit a physical uplink channel signal in the other serving cell(s) within the same subframe, if the total transmission power of the terminal equipment is greater than the maximum output power of the terminal equipment, the terminal equipment adjusts the transmission power of the PRACH signal or adjusts the transmission power of the PRACH signal and the physical uplink channel signal, according to a predefined priority order of the PRACH signal and the physical uplink channel signal, until the adjusted total transmission power is less than or equal to the maximum output power of the terminal equipment.

According to still another aspect of the embodiments of the present invention, there is provided terminal equipment, including:
a first determining unit configured to determine whether the terminal equipment needs to transmit a PRACH signal in a secondary serving cell and transmit an uplink SRS signal in other serving cell(s) within the same OFDM symbol; and
a first processing unit configured to drop the SRS signal in the other serving cell(s) or puncture symbols of the PRACH signal in the secondary serving cell within the same OFDM symbol as the SRS signal in the other serving cell(s) if the determination result of the first determining unit is positive.

Based on the terminal equipment, the terminal equipment further includes:
a second determining unit configured to determine whether the terminal equipment needs to transmit a PRACH signal in a secondary serving cell and transmit a physical uplink channel signal in other serving cell(s) within the same subframe; and
a second processing unit configured to adjust transmission power of the PRACH signal and/or the physical uplink channel signal according to a predefined priority order of the PRACH signal and the physical uplink channel signal when total transmission power is greater than maximum output power when it is determined positive by the second determining unit, until the adjusted total transmission power is less than or equal to the maximum output power of the terminal equipment.

According to still another aspect of the embodiments of the present invention, there is provided terminal equipment, including:
a first determining unit configured to determine whether the terminal equipment needs to transmit a PRACH signal in a secondary serving cell and transmit an uplink SRS signal in other serving cell(s) within the same OFDM symbol;
a first judging unit configured to judge whether total transmission power is greater than maximum output power of the terminal equipment when it is determined positive by the first determining unit; and
a first processing unit configured to adjust the transmission power of the PRACH signal and the SRS signal according to the priority orders of the PRACH signal and the SRS signal when the result of judgment of the first judging unit is positive.

Based on the terminal equipment, the terminal equipment further includes:
a second determining unit configured to determine whether the terminal equipment needs to transmit a PRACH signal in a secondary serving cell and transmit a physical uplink channel signal in other serving cell(s) within the same subframe;
a second judging unit configured to judge whether the total transmission power is greater than the maximum output power of the terminal equipment when it is determined positive by the second determining unit; and
a second processing unit configured to adjust the transmission power of the PRACH signal or adjust the transmission power of the PRACH signal and the physical uplink channel signal according to predefined priority orders of the PRACH signal and the physical uplink channel signal when it is determined positive by the second judging unit, until the adjusted total transmission power is less than or equal to the maximum output power of the terminal equipment.

The advantages of the embodiments of the present invention reside in that the problem that the total transmission power is greater than the configured maximum output power resulted from a scenario newly occurred in Rel-11 such as the terminal equipment transmits PRACHs and SRSs in the same OFMD symbol at the same time is solved, and at the same time, the problem that the total transmission power is greater than the configured maximum output power resulted from transmitting PRACHs and physical uplink channel signals by the terminal equipment in the same subframe at the same time is solved.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment. In the drawings.

DETAILED DESCRIPTION OF THE INVENTION

Foregoing and other features of the embodiments of the present invention will become apparent with reference to the drawings and the following description. These embodiments are illustrative only and are not intended to limit the present invention.

An embodiment of the present invention provides a power control method for terminal equipment, as described in Embodiment 1 below.

Embodiment 1

Figure 1A:
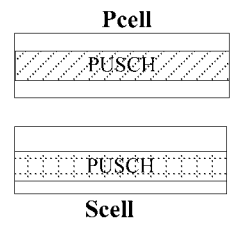
FIG. 1A is a schematic diagram of transmitting multiple PUSCHs by terminal equipment in different cells within the same subframe at the same time in Rel-10 of an LTE-A system.
Figure 1B:
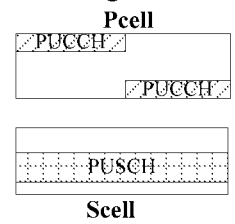
FIG. 1B is a schematic diagram of transmitting PUSCHs and PUCCHs by terminal equipment in different cells within the same subframe at the same time in Rel-10 of an LTE-A system.
Figure 1C:
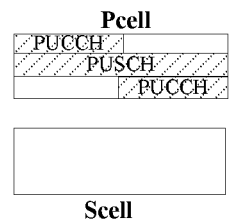
FIG. 1C is a schematic diagram of transmitting PUSCHs and PUCCHs by terminal equipment in a PCell within the same subframe at the same time in Rel-10 of an LTE-A system.
Figure 2A:
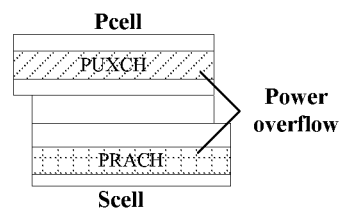
FIGS. 2A, 2B & 2C are schematic diagrams of transmitting PUXCHs and PRACHs by terminal equipment respectively in different cells at the same time in Rel-11 of an LTE-A system.
Figure 2B:
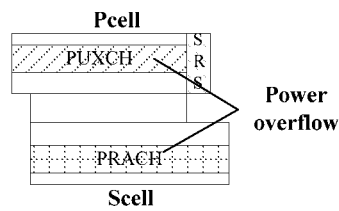
Figure 2C:
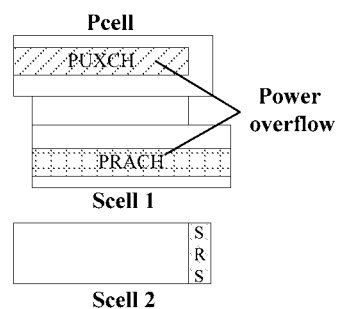
Figure 3A:
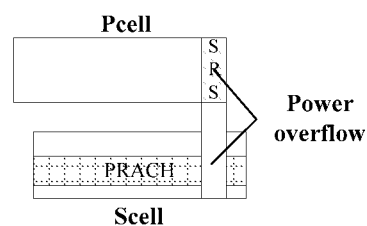
FIGS. 3A & 3B are schematic diagrams of transmitting SRSs and PRACHs by terminal equipment respectively in different cells at the same time in Rel-11 of an LTE-A system.
Figure 3B:
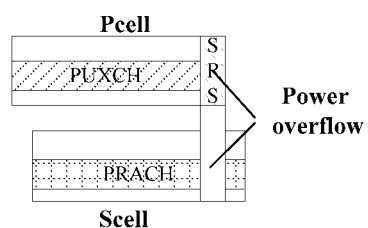
Figure 4A:
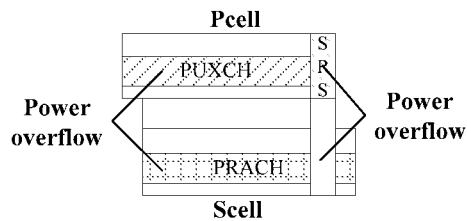
FIGS. 4A & 4B are schematic diagrams of transmitting PUXCHs, SRSs and PRACHs by terminal equipment in different cells at the same time in Rel-11 of an LTE-A system.
Figure 4B:
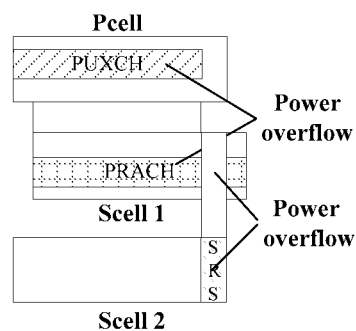
Figure 5:
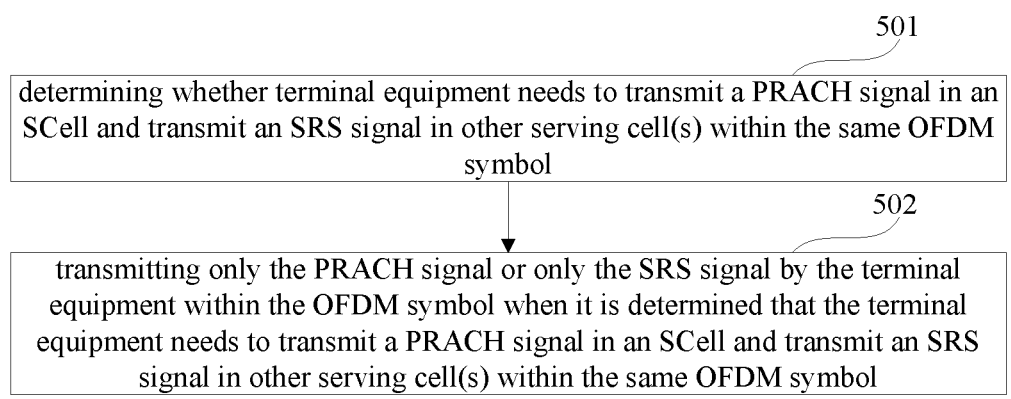
FIG. 5 is a flowchart of a power control method provided by an embodiment of the present invention.

FIG. 5 is a flowchart of the power control method provided by an embodiment of the present invention. Referring to FIG. 5, the method includes:

step 501: determining whether terminal equipment needs to transmit a PRACH signal in a secondary serving cell and transmit an SRS signal in other serving cell(s) within the same OFDM symbol;

wherein, the other serving cell(s) may be PCells or other SCells than said secondary serving cell;

wherein, the SRS signal may be a periodic SRS signal, and may also be an aperiodic SRS signal;

step 502: transmitting only the PRACH signal or only the SRS signal by the terminal equipment within the OFDM symbol when it is determined that the terminal equipment needs to transmit a PRACH signal in an SCell and transmit an SRS signal in other serving cell(s) within the same OFDM symbol;

wherein, if the terminal equipment transmits only the PRACH signal within the OFDM symbol, the terminal equipment may drop an SRS signal in the other serving cell(s), that is, transmitting only the PRACH signal when a PRACH signal and SRS signals in different serving cells need to be transmitted within the same OFDM symbol at the same time is ensured;

wherein, if the terminal equipment transmits only the SRS signal within the OFDM symbol, the terminal equipment punctures symbols of the PRACH signal in the SCell in the same OFDM symbol as that of the SRS signal in the other serving cell(s), that is, transmitting only the SRS signal when a PRACH signal and an SRS signal in different serving cells need to be transmitted within the same OFDM symbol at the same time.

With the above method, when it needs to transmit PRACH signals and SRS signals in different serving cells within the same OFDM symbol at the same time, transmitting only the SRS signals or transmitting only the PRACH signals is selected, thereby lowering the transmission power of the terminal equipment, and solving the problem that the sum of the transmission power of the terminal equipment is greater than the configured maximum output power of the terminal equipment that may be resulted from transmitting SRS signals and PRACH signals in the same OFDM symbol at the same time.

An embodiment of the present invention further provides a power control method for terminal equipment, as described in Embodiment 2 below. This method is a power control process of the terminal equipment on the basis of the method of Embodiment 1 when it is determined that the terminal equipment needs to transmit PRACH signals in an SCell and transmit physical uplink channels signals in other serving cell(s) within the same subframe. Wherein, contents identical to those in Embodiment 1 are omitted herein.

Embodiment 2

Figure 6:
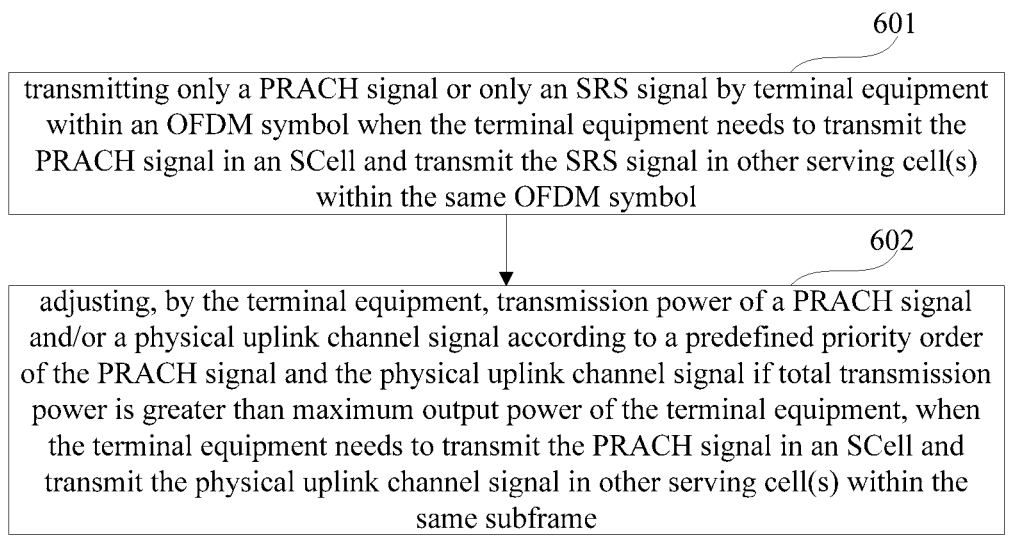
FIG. 6 is a flowchart of a power control method based on the embodiment of FIG. 5 and provided by another embodiment of the present invention.

FIG. 6 is a flowchart of the power control method provided by an embodiment of the present invention. As shown in FIG. 6, the method includes:

step 601: transmitting only a PRACH signal or only an SRS signal by terminal equipment within an OFDM symbol when the terminal equipment needs to transmit the PRACH signal in an SCell and transmit the SRS signal in other serving cell(s) within the same OFDM symbol;

wherein, the processing in step 601 is identical to the processing in the method of Embodiment 1 and is omitted herein;

step 602: adjusting, by the terminal equipment, transmission power of a PRACH signal and/or a physical uplink channel signal according to a predefined priority order of the PRACH signal and the physical uplink channel signal if total transmission power of the terminal equipment (i.e. the sum of the transmission power for transmitting the PRACH and the transmission power for transmitting the physical uplink channel signal) obtained through calculation is greater than maximum output power of the terminal equipment, when the terminal equipment needs to transmit the PRACH signal in an SCell and transmit the physical uplink channel signal in other serving cell(s) within the same subframe, until the adjusted total transmission power is less than or equal to the maximum output power of the terminal equipment;

wherein, the physical uplink channel signal transmitted in the other serving cell(s) may be any combination of the following signals: a PUCCH signal, a PUSCH signal with UCI, and a PUSCH with no UCI; and wherein, the other serving cell(s) are different according to the types of the physical uplink channel signals; for example, for a PUSCH signal, the other serving cell(s) here may be PCell, and may also be other SCell(s) than said SCell; and for a PUCCH signal, the other serving cell(s) here may be PCell;

wherein, as the types of the physical uplink channel signals transmitted in the other serving cell(s) are different, when it is determined in this embodiment that the total transmission power of the terminal equipment in transmitting the PRACH signal and the physical uplink channel signal is greater than the maximum output power of the terminal equipment, the terminal equipment adjusts the transmission power of the PRACH signal or the physical uplink channel signal according to a predefined priority order of the PRACH signal and the physical uplink channel signal, until the adjusted total transmission power is less than or equal to the maximum output power of the terminal equipment; and wherein, the priority order of each signal may be predefined, which is defined in this embodiment as: the priority order of the PUSCH signal with no UCI is less than or equal to that of the PRACH signal, the priority order of the PRACH signal is less than that of the PUSCH signal with UCI, and the priority order of the PUSCH signal with UCI is less than that of the PUCCH signal.

In this embodiment, as a signal of relatively lower priority order is relatively less important to the terminal equipment, the transmission power of the signal of relatively lower priority order is lowered in this embodiment in accordance with this rule, so as to ensure the transmission of a signal of relatively higher priority order. In the following description, the remaining transmission power refers to the maximum output power of the terminal equipment subtracted by the allocated transmission power.

In an implementation, step 602 may be carried out by the method shown in FIGS. 7a-7c, and will be described below in detail with reference to FIGS. 7a-7c.

Figure 7A:
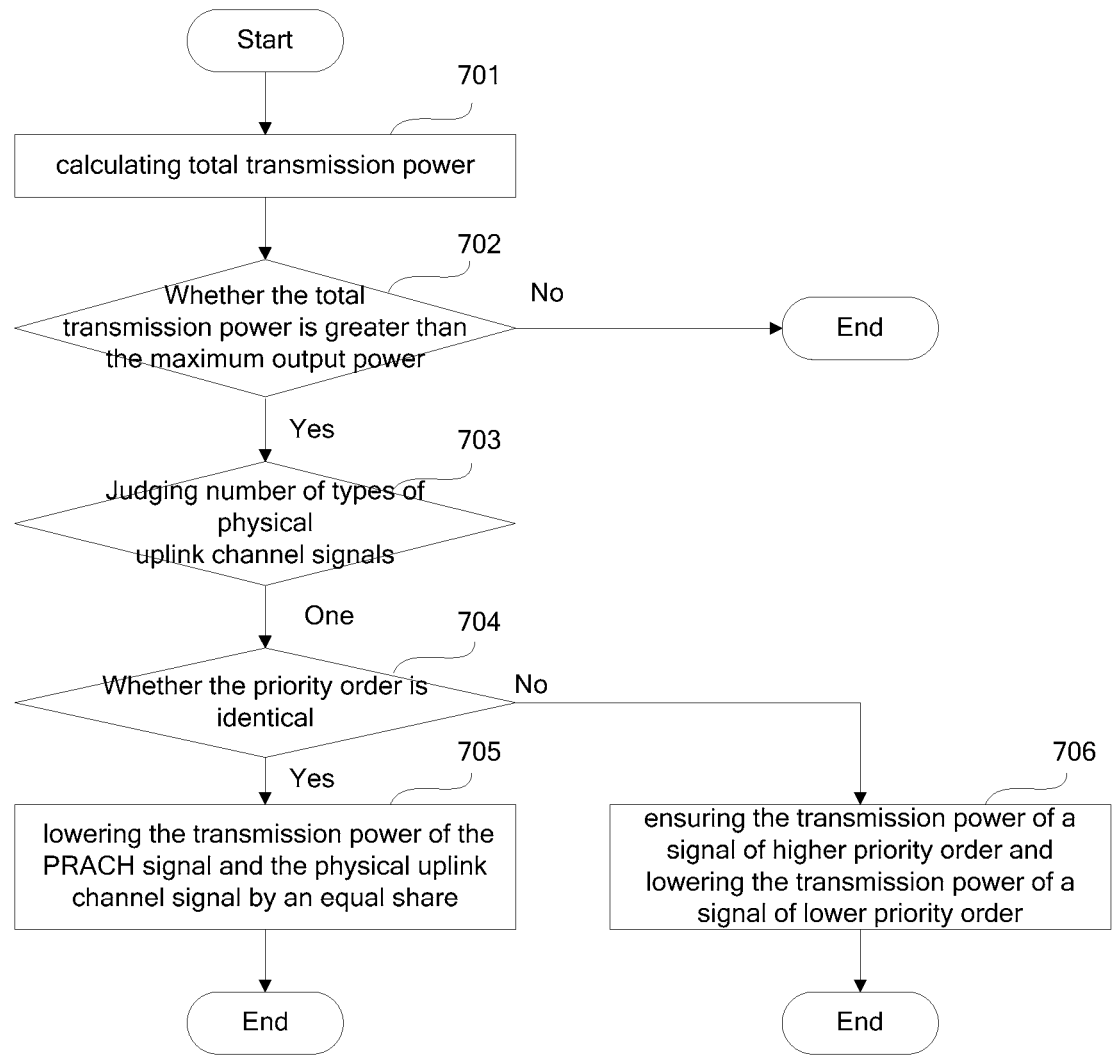
FIGS. 7A, 7B & 7C are flowcharts of step 602 in the embodiment of FIG. 6.
Figure 7B:
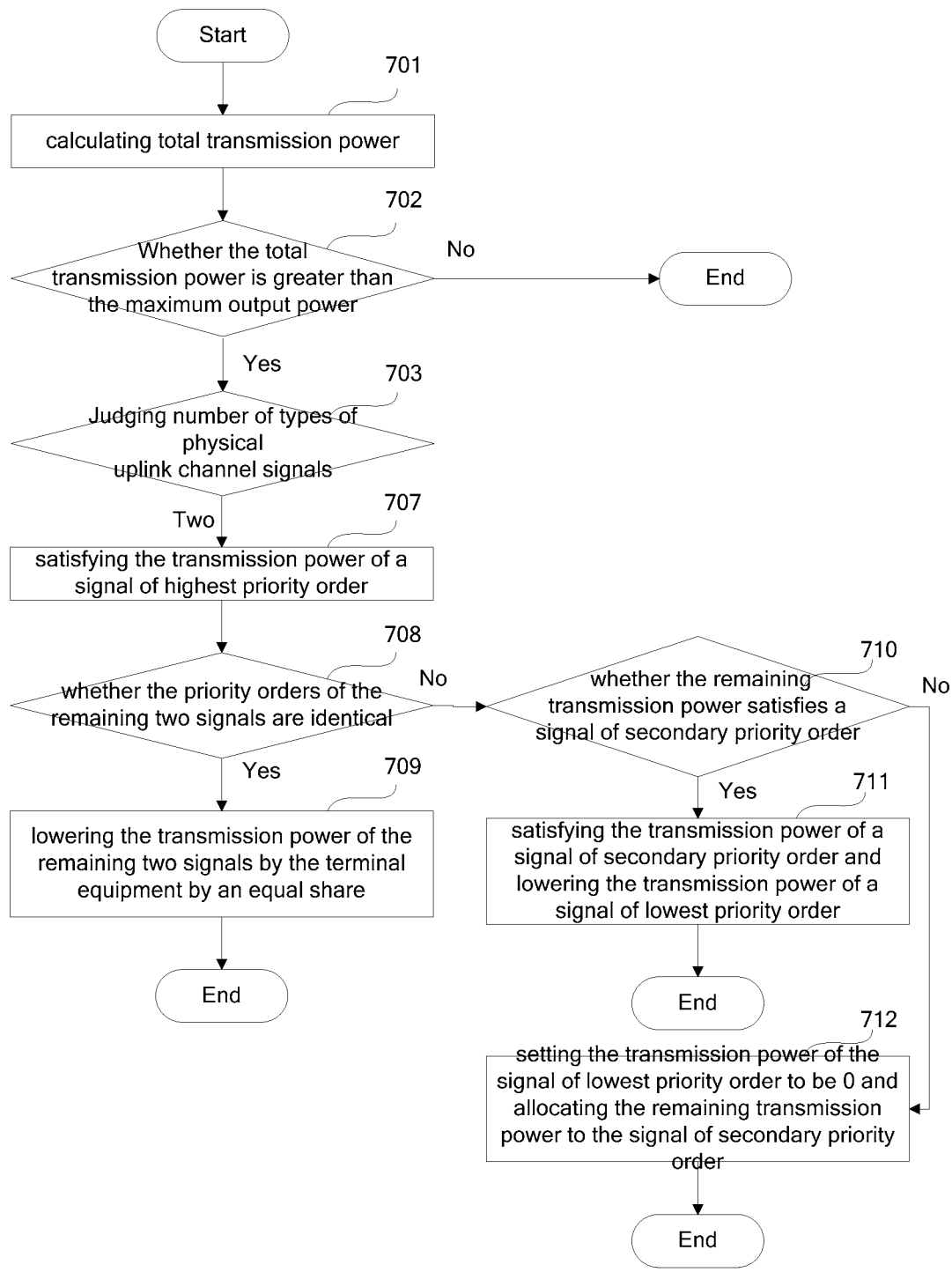
Figure 7C:
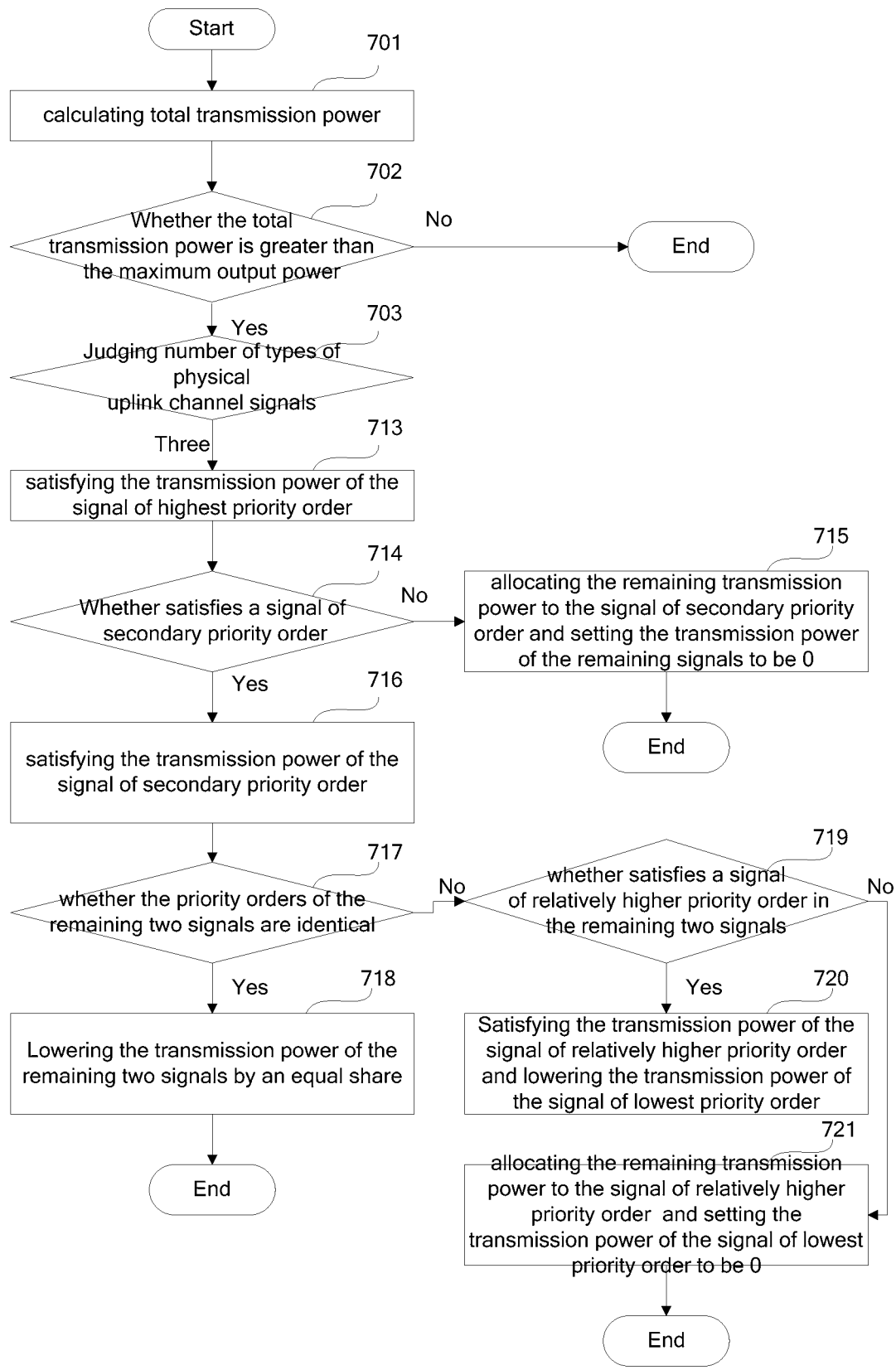

Referring to FIGS. 7a-7c, the method includes:

step 701: obtaining total transmission power by the terminal equipment by calculating the transmission power of the signals to be transmitted;

step 702: judging by the terminal equipment whether the total transmission power is greater than the maximum output power of the terminal equipment; and executing step 703 if yes; otherwise, terminating the process;

step 703: judging a type of physical uplink channel signals to be transmitted by the terminal equipment; executing step 704 if there is only one type, executing step 707 if there are two types, and executing step 713 if there are three types;

refer to FIG. 7a for the case where there is only one type of physical uplink channel signals to be transmitted at the same time;

step 704: judging by the terminal equipment whether the priority order of the PRACH signal is identical to that of the physical uplink channel signal to be transmitted; and executing step 705 if yes; otherwise, executing step 706;

step 705: lowering the transmission power of the PRACH signal and the physical uplink channel signal by the terminal equipment by an equal share, until the adjusted total transmission power is less than or equal to the maximum output power of the terminal equipment;

step 706: satisfying the transmission power of a signal of higher priority order and lowering the transmission power of a signal of lower priority order by the terminal equipment, until the adjusted total transmission power is less than or equal to the maximum output power of the terminal equipment;

refer to FIG. 7b for the case where there are two types of physical uplink channel signals to be transmitted at the same time;

step 707: satisfying the transmission power of a signal of highest priority order by the terminal equipment;

step 708: judging by the terminal equipment whether the priority orders of the remaining two signals are identical; and executing step 709 if yes; otherwise, executing step 710;

step 709: lowering the transmission power of the remaining two signals (i.e. the PRACH signal and the physical uplink channel signal) by the terminal equipment by an equal share, until the adjusted total transmission power is less than or equal to the maximum output power of the terminal equipment;

step 710: judging by the terminal equipment whether the remaining transmission power satisfies a signal of secondary priority order; and executing step 711 if yes; otherwise, executing step 712;

step 711: satisfying the transmission power of a signal of secondary priority order and lowering the transmission power of a signal of lowest priority order by the terminal equipment, until the adjusted total transmission power is less than or equal to the maximum output power of the terminal equipment;

step 712: setting the transmission power of the signal of lowest priority order to be 0 and allocating the remaining transmission power to the signal of secondary priority order by the terminal equipment;

refer to FIG. 7c for the case where there are three types of physical uplink channel signals to be transmitted at the same time;

step 713: satisfying the transmission power of the signal of highest priority order by the terminal equipment;

step 714: judging by the terminal equipment whether the remaining transmission power satisfies a signal of secondary priority order; and executing step 716 if yes; otherwise, executing step 715;

step 715: allocating the remaining transmission power to the signal of secondary priority order and setting the transmission power of the remaining signals to be 0 by the terminal equipment;

step 716: satisfying the transmission power of the signal of secondary priority order by the terminal equipment;

step 717: judging by the terminal equipment whether the priority orders of the remaining two signals are identical; and executing step 718 if yes; otherwise, executing step 719;

step 718: lowering the transmission power of the remaining two signals by the terminal equipment by an equal share, until the adjusted total transmission power is less than or equal to the maximum output power of the terminal equipment;

step 719: judging by the terminal equipment whether the remaining transmission power satisfies a signal of relatively higher priority order in the remaining two signals; and executing step 720 if yes; otherwise, executing step 721;

step 720: satisfying the transmission power of the signal of relatively higher priority order in the remaining two signals and lowering the transmission power of the signal of lowest priority order by the terminal equipment, until the adjusted total transmission power is less than or equal to the maximum output power of the terminal equipment; and step 721: allocating the remaining transmission power to the signal of relatively higher priority order in the remaining two signals and setting the transmission power of the signal of lowest priority order to be 0 by the terminal equipment.

In this embodiment, as the types and priority orders of the physical uplink channel signals needing to be transmitted in the other serving cell(s) are different, the signals needing to be adjusted with respect to transmission power are also different. For the method of FIG. 7a-FIG. 7c to be more clear, following description is given for different cases.

For the case where there is only one type of physical uplink channel signals.

If the physical uplink channel signals are PUSCH signals with no UCI, that is, when the terminal equipment needs to transmit PRACH signals in an SCell and transmit PUSCH signals with no UCI in a PCell or other SCell(s) within the same subframe, the terminal equipment first calculates the transmission power needed by each PUSCH and the transmission power needed by the PRACHs according to above formulae (5) and (4) respectively. If the total transmission power thus obtained exceeds the maximum output power of the terminal equipment, according to what is predefined in this embodiment that the priority order of a PUSCH signal with no UCI is less than or equal to the priority order of a PRACH signal, the adjusting policy determined by the terminal equipment according to the predefined priority order is as follows: if the priority order of a PUSCH signal with no UCI is equal to the priority order of a PRACH signal, the terminal equipment lowers the transmission power of the PRACHs and all the PUSCHs with no UCI by an equal share, until that the total transmission power is less than or equal to the maximum output power of the terminal equipment is ensured; and if the priority order of a PUSCH signal with no UCI is less than the priority order of a PRACH signal, the terminal equipment first satisfies the transmission power of the PRACHs, that is, allocating the transmission power needed by the PRACHs to the PRACHs, and then lowers the transmission power of each PUSCH with no UCI by an equal share, until that the total transmission power is less than or equal to the maximum output power of the terminal equipment is ensured.

If the physical uplink channel signals are PUSCH signals with UCI, that is, when the terminal equipment needs to transmit PRACH signals in an SCell and transmit PUSCH signals with UCI in a PCell or other SCell(s) within the same subframe, the terminal equipment first calculates the transmission power needed by the PUSCHs and the transmission power needed by the PRACHs according to above formulae (5) and (4) respectively. If the total transmission power thus obtained exceeds the maximum output power of the terminal equipment, according to what is predefined in this embodiment that the priority order of a PRACH signal is less than the priority order of a PUSCH signal with UCI, the terminal equipment first ensures satisfying the transmission power of the PUSCHs with UCI, that is, allocating the transmission power needed by the PUSCHs with UCI to the PUSCHs with UCI, and then lowers the transmission power of the PRACHs, until that the total transmission power is less than or equal to the maximum output power of the terminal equipment is ensured.

If the physical uplink channel signals are PUCCH signals, that is, when the terminal equipment needs to transmit PRACH signals in an SCell and transmit PUCCH signals in a PCell within the same subframe, the terminal equipment first calculates the transmission power needed by the PUCCHs and the transmission power needed by the PRACHs according to above formulae (7) and (4) respectively. If the total transmission power thus obtained exceeds the maximum output power of the terminal equipment, according to what is predefined in this embodiment that the priority order of a PRACH signal is less than the priority order of a PUCCH signal, the terminal equipment first ensures satisfying the transmission power of the PUCCHs, that is, allocating the transmission power needed by the PUCCHs to the PUCCHs, and then lowers the transmission power of the PRACHs, until that the total transmission power is less than or equal to the maximum output power of the terminal equipment is ensured.

For the case where there are two types of physical uplink channel signals.

If the physical uplink channel signals are PUSCH signals with no UCI and PUSCH signals with UCI, that is, when the terminal equipment needs to transmit PRACH signals in an SCell and transmit PUSCH signals with no UCI and PUSCH signals with UCI in a PCell or other SCell(s) within the same subframe, the terminal equipment first calculates the transmission power needed by the PUSCHs and the transmission power needed by the PRACHs according to above formulae (5) and (4) respectively. If the total transmission power thus obtained exceeds the maximum output power of the terminal equipment, according to what is predefined in this embodiment that the priority order of a PUSCH signal with no UCI is less than or equal to the priority order of a PRACH signal and the priority order of a PRACH signal is less than the priority order of a PUSCH signal with UCI, the terminal equipment first ensures satisfying the transmission power of the PUSCHs with UCI, that is, allocating the transmission power needed by the PUSCHs with UCI to the PUSCHs with UCI, and processes the remaining transmission power in different ways, as the priority order of a PUSCH signal with no UCI is less than or equal to the priority order of a PRACH signal, which are transmitted at the same time. For the case where the priority order of a PUSCH signal with no UCI is less than the priority order of a PRACH signal, the terminal equipment judges whether the remaining transmission power satisfies the transmission power needed by the PRACH signals; if yes, the terminal equipment satisfies the transmission power of the PRACH signals, and then lowers the transmission power of all the PUSCHs with no UCI by an equal share, until that the total transmission power is less than or equal to the maximum output power of the terminal equipment is ensured; and if no, the terminal equipment sets the transmission power of the PUSCH signals with no UCI to be 0, and allocates the remaining transmission power to the PRACH signals. For the case where the priority order of a PUSCH signal with no UCI is equal to the priority order of a PRACH signal, the terminal equipment lowers the transmission power of the PRACHs and all the PUSCHs with no UCI by an equal share, until that the total transmission power is less than or equal to the maximum output power of the terminal equipment is ensured.

If the physical uplink channel signals are PUSCH signals with no UCI and PUCCH signals, that is, when the terminal equipment needs to transmit PRACH signals in an SCell and transmit PUSCH signals with no UCI in a PCell or other SCell(s) and transmit PUCCH signals in a PCell within the same subframe, the terminal equipment first calculates the transmission power needed by the PUCCHs, the transmission power needed by the PUSCHs and the transmission power needed by the PRACHs according to above formulae (4), (5) and (7), or (4), (6) and (7), respectively. If the total transmission power thus obtained exceeds the maximum output power of the terminal equipment, according to what is predefined in this embodiment that the priority order of a PUSCH signal with no UCI is less than or equal to the priority order of a PRACH signal and the priority order of a PRACH signal is less than the priority order of a PUCCH signal, the terminal equipment first ensures satisfying the transmission power of the PUCCH signals, that is, allocating the transmission power needed by the PUCCHs to the PUCCHs, and processes the remaining transmission power in different ways, as the priority order of a PUSCH signal with no UCI is less than or equal to the priority order of a PRACH signal, which are transmitted at the same time. For the case where the priority order of a PUSCH signal with no UCI is less than the priority order of a PRACH signal, the terminal equipment judges whether the remaining transmission power satisfies the transmission power needed by the PRACH signals; if yes, the terminal equipment satisfies the transmission power of the PRACH signals, and then lowers the transmission power of all the PUSCH signals with no UCI by an equal share, until that the total transmission power is less than or equal to the maximum output power of the terminal equipment is ensured; and if no, the terminal equipment sets the transmission power of the PUSCH signals with no UCI to be 0, and allocates the remaining transmission power to the PRACH signals. For the case where the priority order of a PUSCH signal with no UCI is equal to the priority order of a PRACH signal, the terminal equipment lowers the transmission power of the PRACHs and all the PUSCHs with no UCI by an equal share, until that the total transmission power is less than or equal to the maximum output power of the terminal equipment is ensured.

If the physical uplink channel signals are PUSCH signals with UCI and PUCCH signals, that is, when the terminal equipment needs to transmit PRACH signals in an SCell and transmit PUSCH signals with UCI in a PCell or other SCell(s) and transmit PUCCH signals in a PCell within the same subframe, the terminal equipment first calculates the transmission power needed by the PUCCHs and the transmission power needed by the PUSCHs and the transmission power needed by the PRACHs according to above formulae (4), (5) and (7), or (4), (5) and (6), respectively. If the total transmission power thus obtained exceeds the maximum output power of the terminal equipment, according to what is predefined in this embodiment that the priority order of a PRACH signal is less than the priority order of a PUSCH signal with UCI and the priority order of a PUSCH signal with UCI is less than the priority order of a PUCCH signal, the terminal equipment first ensures satisfying the transmission power of the PUCCHs, that is, allocating the transmission power needed by the PUCCHs to the PUCCHs. For the remaining transmission power, the terminal equipment judges whether the remaining transmission power satisfies the transmission power of the PUSCH signals with UCI; if yes, the terminal equipment satisfies the transmission power of the PUSCH signals with UCI, and then allocates the remaining transmission power to the PRACHs; and if no, the terminal equipment sets the transmission power of the PRACHs to be 0, and allocates the remaining transmission power to the PUSCH signals with UCI.

For the case where there are three types of physical uplink channel signals.

If the physical uplink channel signals are PUSCH signals with no UCI, PUSCH signals with UCI and PUCCH signals, that is, when the terminal equipment needs to transmit PRACH signals in an SCell, transmit PUSCH signals with UCI and PUSCH signals with no UCI in a PCell or other SCell(s) and transmit PUCCH signals in a PCell within the same subframe, the terminal equipment first calculates the transmission power needed by the PUCCHs, the transmission power needed by the PUSCHs and the transmission power needed by the PRACHs according to above formulae (4), (5) and (7), or (4), (5) and (6), respectively. If the total transmission power thus obtained exceeds the maximum output power of the terminal equipment, according to what is predefined in this embodiment that the priority order of a PUSCH signal with no UCI is less than or equal to the priority order of a PRACH signal, the priority order of a PRACH signal is less than the priority order of a PUSCH signal with UCI and the priority order of a PUSCH signal with UCI is less than the priority order of a PUCCH signal, the terminal equipment first ensures satisfying the transmission power of the PUCCHs, that is, allocating the transmission power needed by the PUCCHs to the PUCCHs. For the remaining transmission power, the terminal equipment judges whether the remaining transmission power satisfies the transmission power of the PUSCH signals with UCI; if the transmission power of the PUSCH signals with UCI can be satisfied, the terminal equipment satisfies the transmission power of the PUSCH signals with UCI. And the terminal equipment processes the remaining transmission power in different ways, as the priority order of a PUSCH signal with no UCI is less than or equal to the priority order of a PRACH signal, which are transmitted at the same time. For the case where the priority order of a PUSCH signal with no UCI is less than the priority order of a PRACH signal, the terminal equipment judges whether the remaining transmission power satisfies the transmission power needed by the PRACH signals; if yes, the terminal equipment satisfies the transmission power of the PRACH signals, and then lowers the transmission power of all the PUSCH signals with no UCI by an equal share, until that the total transmission power is less than or equal to the maximum output power of the terminal equipment is ensured; and if no, the terminal equipment sets the transmission power of the PUSCH signals with no UCI to be 0, and allocates the remaining transmission power to the PRACH signals. For the case where the priority order of a PUSCH signal with no UCI is equal to the priority order of a PRACH signal, the terminal equipment lowers the transmission power of the PRACHs and all the PUSCHs with no UCI by an equal share, until that the total transmission power is less than or equal to the maximum output power of the terminal equipment is ensured. And if the transmission power of the PUSCH signals with UCI cannot be satisfied, the terminal equipment sets the transmission power of the PRACHs and all the PUSCHs with no UCI to be 0, and allocates the remaining transmission power to the PUSCH signals with UCI at the same time.

With the power control method of this embodiment, when the terminal equipment needs to transmit PRACH signals and SRS signals in different serving cells within the same OFDM symbol at the same time, the transmission power of the terminal equipment is lowered by dropping the SRS signals and transmitting only the PRACH signals, or by puncturing the PRACH signals in the same OFDM symbol as the SRS signals and transmitting only the SRS signals, and the problem that the total transmission power is greater than the configured maximum output power resulted from transmitting SRS signals and PRACH signals by the terminal equipment in the same OFDM symbol at the same time is solved. Furthermore, when the terminal equipment needs to transmit PRACH signals in an SCell and transmit physical uplink channel signals in other cell(s) within the same subframe, if the transmission power of the terminal equipment is greater than the maximum output power of the terminal equipment, the terminal equipment may determine a power control policy according to the priority orders of the PRACH signals and each physical uplink channel signal, so as to ensure that the total transmission power is less than or equal to the maximum output power of the terminal equipment, thereby providing a practical and feasible power control method for a scenario newly occurred in Rel-11 in which the power of the terminal equipment is limited.

An embodiment of the present invention further provides a power control method, as described in Embodiment 3 below. Different from those in embodiments 1 and 2, in the method in Embodiment 3, in case that PRACH signals and SRS signals are transmitted in the same OFDM symbol at the same time, not one type of the signals are transmitted, but the two types of the signals are transmitted at the same time with the transmission power of one type of the signals of relatively lower priority order to be controlled according to a priority order policy, which shall be described below in detail.

Embodiment 3

Figure 8:
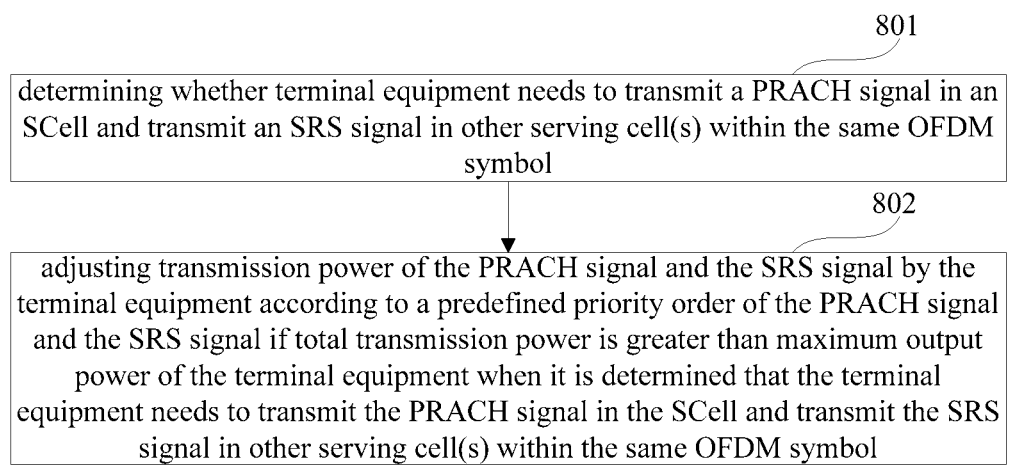
FIG. 8 is a flowchart of a power control method provided by still another embodiment of the present invention.

FIG. 8 is a flowchart of the power control method provided by an embodiment of the present invention. Referring to FIG. 8, the method includes:

step 801: determining whether terminal equipment needs to transmit a PRACH signal in an SCell and transmit an SRS signal in other serving cell(s) within the same OFDM symbol;

wherein, the other serving cell(s) may be PCell or other SCell(s) than said SCell;

wherein, the SRS signal may be a periodic SRS signal, and may also be an aperiodic SRS signal;

step 802: adjusting transmission power of the PRACH signal and the SRS signal by the terminal equipment according to a predefined priority order of the PRACH signal and the SRS signal if total transmission power of the terminal equipment (i.e. the sum of the transmission power for transmitting PRACH signals and the transmission power for transmitting SRS signals) obtained through calculation is greater than maximum output power of the terminal equipment when it is determined that the terminal equipment needs to transmit the PRACH signal in the SCell and transmit the SRS signal in other serving cell(s) within the same OFDM symbol;

wherein, if the priority order of the PRACH signal predefined in this embodiment is less than that of the SRS signal, the terminal equipment first judges whether the maximum output power of the terminal equipment satisfies the transmission power for transmitting SRS; if yes, the terminal equipment satisfies the transmission power for transmitting SRS, and then allocates the remaining transmission power to the PRACH; and if no, the terminal equipment sets the transmission power of the PRACH to be 0, and allocates the transmission power (the maximum output power) to all the SRS signals by an equal share.

With the above method, when it needs to transmit PRACH signals and SRS signals in different serving cells within the same OFDM symbol at the same time, the terminal equipment ensures the transmission of the signals of higher priory order, such as the transmission of the SRS signals, by controlling the transmission power of the signals, thereby solving the problem that the sum of the transmission power is greater than the maximum output power that may be resulted from transmitting SRS signals and PRACH signals by the terminal equipment in the same OFDM symbol at the same time.

An embodiment of the present invention further provides a power control method for terminal equipment, as described in Embodiment 4 below. This method is a power control process of the terminal equipment on the basis of the method of Embodiment 3 when it is determined that the terminal equipment needs to transmit PRACH signals in an SCell and transmit physical uplink channels signals in other serving cell(s) within the same subframe. Wherein, contents identical to those in Embodiment 3 are omitted herein.

Embodiment 4

Figure 9:
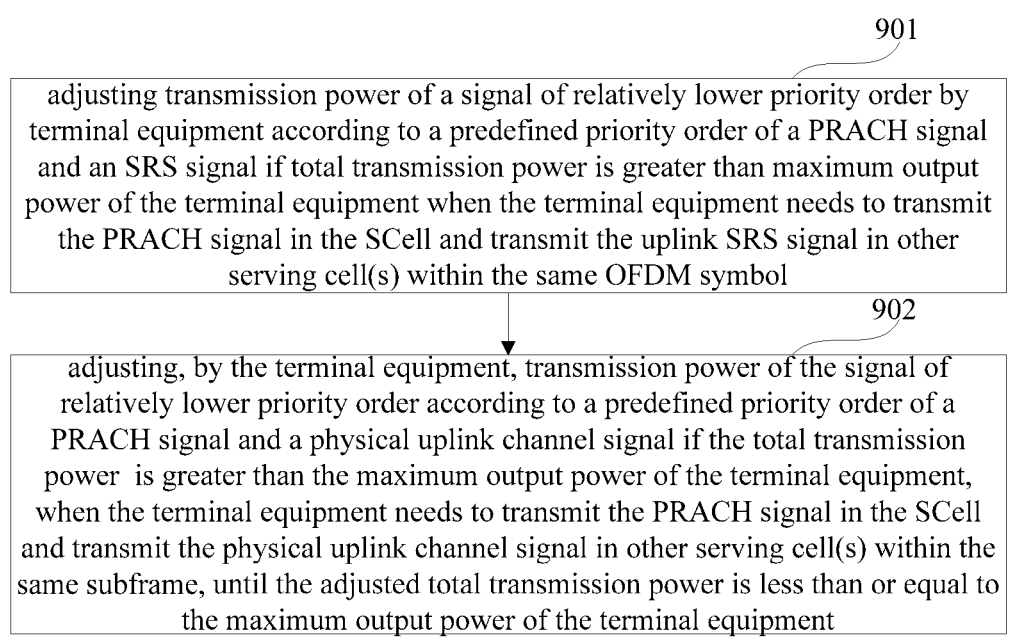
FIG. 9 is a flowchart of a power control method based on the embodiment of FIG. 8 and provided by further still another embodiment of the present invention.

FIG. 9 is a flowchart of the power control method provided by an embodiment of the present invention. Referring to FIG. 9, the method includes:

step 901: adjusting transmission power of a signal of relatively lower priority order by terminal equipment according to a predefined priority order of a PRACH signal and an SRS signal if total transmission power of the terminal equipment (i.e. the sum of the transmission power for transmitting PRACH signals and the transmission power for transmitting SRS signals) obtained through calculation is greater than maximum output power of the terminal equipment when the terminal equipment needs to transmit the PRACH signal in the SCell and transmit the uplink SRS signal in other serving cell(s) within the same OFDM symbol;

wherein, the processing in step 901 is identical to the processing in the method of Embodiment 3 and is omitted herein;

step 902: adjusting, by the terminal equipment, transmission power of the signal of relatively lower priority order according to a predefined priority order of a PRACH signal and a physical uplink channel signal if the total transmission power of the terminal equipment (i.e. the sum of the transmission power for transmitting the PRACH and the transmission power for transmitting the physical uplink channel signal) obtained through calculation is greater than the maximum output power of the terminal equipment, when the terminal equipment needs to transmit the PRACH signal in the SCell and transmit the physical uplink channel signal in other serving cell(s) within the same subframe, until the adjusted total transmission power is less than or equal to the maximum output power of the terminal equipment;

wherein, the physical uplink channel signal transmitted in the other serving cell(s) may be any combination of the following signals: a PUCCH signal, a PUSCH signal with UCI, and a PUSCH signal with no UCI; and wherein, the other serving cell(s) are different according to the types of the physical uplink channel signals; for example, for a PUSCH signal, the other serving cell(s) here may be a PCell, and may also be other SCell(s) than said SCell; and for a PUCCH signal, the other serving cell(s) here may be a PCell;

wherein, as the types of the physical uplink channel signals transmitted in the other serving cell(s) are different, when it is determined in this embodiment that the total transmission power of the terminal equipment in transmitting the PRACH signal and the physical uplink channel signal is greater than the maximum output power of the terminal equipment, the terminal equipment adjusts the transmission power of the signal of relatively lower priority order according to priority orders of the PRACH signal and the physical uplink channel signal, until the adjusted total transmission power is less than or equal to the maximum output power of the terminal equipment; and wherein, the priority order of each signal may be predefined, which is defined in this embodiment as: the priority order of the PRACH signal is less than that of the PUSCH signal with no UCI, the priority order of the PUSCH signal with no UCI is less than that of the PUSCH signal with UCI, and the priority order of PUSCH signal with UCI is less than that of the PUCCH signal.

In this embodiment, as a signal of relatively lower priority order is relatively less important to the terminal equipment, the transmission power of the signal of relatively lower priority order is lowered in this embodiment in accordance with this rule, so as to ensure the transmission of a signal of relatively higher priority order. In the following description, the remaining transmission power refers to the maximum output power of the terminal equipment subtracted by the allocated transmission power.

In this embodiment, as PRACHs and SRSs are transmitted in the same OFDM symbol, when PRACHs and physical uplink channel signals are transmitted in the same subframe, the processing of step 902 in Embodiment 4 is slightly different from that of step 602 in Embodiment 2. In which, step 902 may be carried out by the method shown in FIGS. 10a-10c, and will be described below in detail with reference to FIGS. 10a-10c.

Figure 10A:
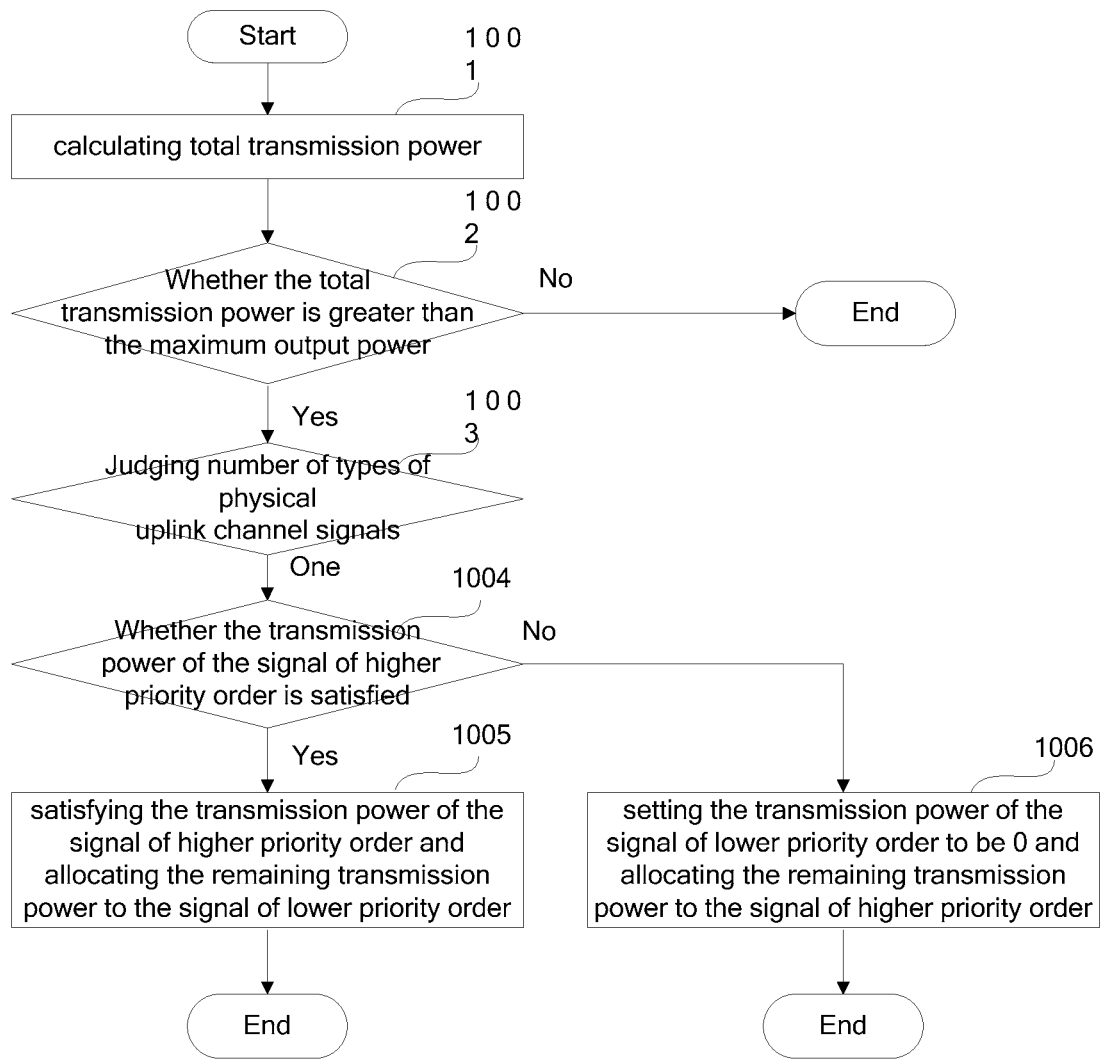
FIGS. 10A, 10B & 10C are flowcharts of step 902 in the embodiment of FIG. 9.
Figure 10B:
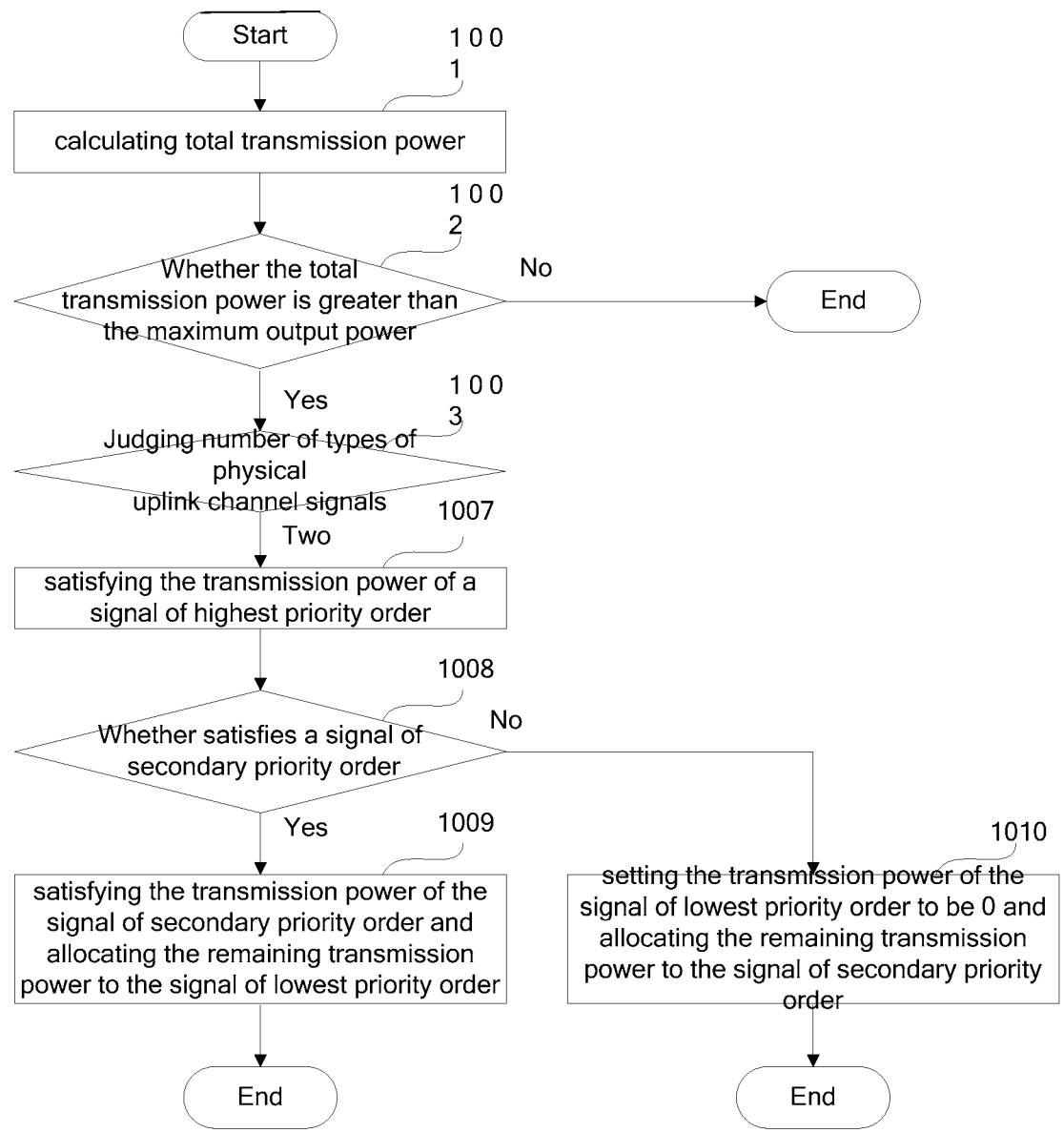
Figure 10C:
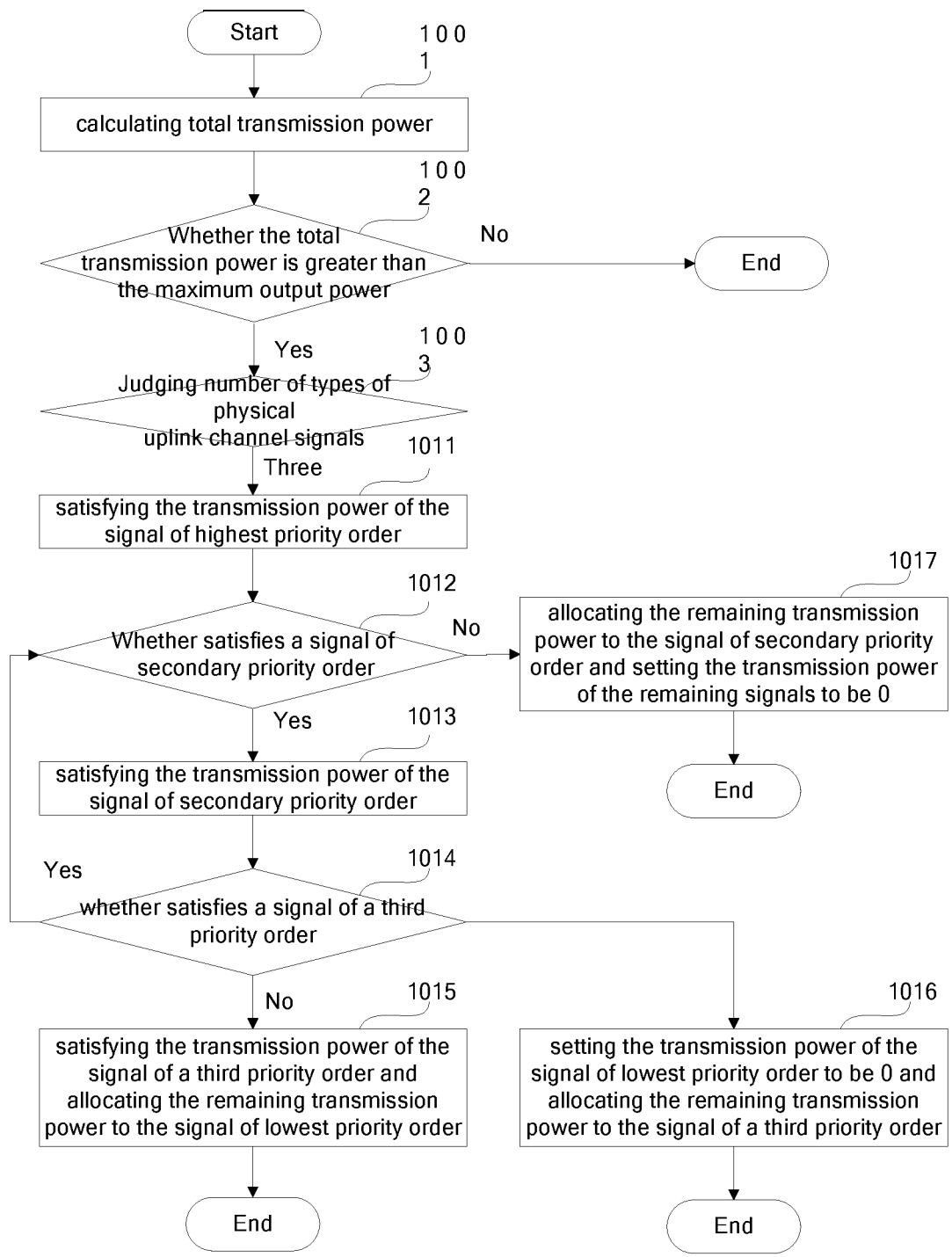

Referring to FIGS. 10a-10c, the method includes:

step 1001: obtaining total transmission power by the terminal equipment by calculating the transmission power of the signals to be transmitted;

step 1002: judging by the terminal equipment whether the total transmission power is greater than the maximum output power of the terminal equipment; and executing step 1003 if yes; otherwise, terminating the process;

step 1003: judging the number of types of the transmitted physical uplink channel signals by the terminal equipment; executing step 1004 if there is only one type, executing step 1007 if there are two types, and executing step 1011 if there are three types;

refer to FIG. 10a for the case where there is only one type of physical uplink channel signals;

step 1004: judging by the terminal equipment whether the transmission power of the signal of higher priority order is satisfied; and executing step 1005 if yes; otherwise, executing step 1006;

step 1005: satisfying the transmission power of the signal of higher priority order and allocating the remaining transmission power to the signal of lower priority order by the terminal equipment;

step 1006: setting the transmission power of the signal of lower priority order to be 0 and allocating the remaining transmission power to the signal of higher priority order by the terminal equipment;

refer to FIG. 10b for the case where there are two types of physical uplink channel signals;

step 1007: satisfying the transmission power of a signal of highest priority order by the terminal equipment;

step 1008: judging by the terminal equipment whether the remaining transmission power satisfies a signal of secondary priority order; and executing step 1009 if yes; otherwise, executing step 1010;

step 1009: satisfying the transmission power of the signal of secondary priority order and allocating the remaining transmission power to the signal of lowest priority order by the terminal equipment;

step 1010: setting the transmission power of the signal of lowest priority order to be 0 and allocating the remaining transmission power to the signal of secondary priority order by the terminal equipment;

refer to FIG. 10c for the case where there are three types of physical uplink channel signals;

step 1011: satisfying the transmission power of the signal of highest priority order by the terminal equipment;

step 1012: judging by the terminal equipment whether the remaining transmission power satisfies a signal of secondary priority order; and executing step 1013 if yes; otherwise, executing step 1017;

step 1013: satisfying the transmission power of the signal of secondary priority order by the terminal equipment;

step 1014: judging by the terminal equipment whether the remaining transmission power satisfies a signal of a third priority order; and executing step 1015 if yes; otherwise, executing step 1016;

step 1015: satisfying the transmission power of the signal of a third priority order and allocating the remaining transmission power to the signal of lowest priority order;

step 1016: setting the transmission power of the signal of lowest priority order to be 0 and allocating the remaining transmission power to the signal of a third priority order by the terminal equipment;

step 1017: allocating the remaining transmission power to the signal of secondary priority order and setting the transmission power of the remaining signals to be 0 by the terminal equipment.

In this embodiment, as the types and priority orders of the physical uplink channel signals needing to be transmitted in the other serving cell(s) are different, the signals needing to be adjusted with respect to transmission power are also different. For the method of FIG. 10a-FIG. 10c to be more clear, following description is given for different cases.

For the case where there is only one type of physical uplink channel signals.

If the physical uplink channel signals are PUSCH signals with no UCI, that is, when the terminal equipment needs to transmit PRACH signals in an SCell and transmit PUSCH signals with no UCI in a PCell or other SCell(s) within the same subframe, the terminal equipment first calculates the transmission power needed by each PUSCH and the transmission power needed by the PRACHs according to above formulae (5) and (4) respectively. If the total transmission power thus obtained exceeds the maximum output power of the terminal equipment, according to what is predefined in this embodiment that the priority order of a PRACH signal is less than the priority order of a PUSCH signal with no UCI, the terminal equipment first judges whether the transmission power of all the PUSCHs with no UCI is satisfied; if the result of judgment is yes, the terminal equipment satisfies the transmission power of all the PUSCHs with no UCI, and allocates the remaining transmission power to the PRACHs; and if the result of judgment is no, the terminal equipment sets the transmission power of the PRACHs to be 0, and allocates the remaining transmission power to each of the PUSCHs with no UCI by an equal share.

If the physical uplink channel signals are PUSCH signals with UCI, that is, when the terminal equipment needs to transmit PRACH signals in an SCell and transmit PUSCH signals with UCI in a PCell or other SCell(s) within the same subframe, the terminal equipment first calculates the transmission power needed by the PUSCHs and the transmission power needed by the PRACHs according to above formulae (5) and (4) respectively. If the total transmission power thus obtained exceeds the maximum output power of the terminal equipment, according to what is predefined in this embodiment that the priority order of a PRACH signal is less than the priority order of a PUSCH signal with UCI, the terminal equipment first ensures satisfying the transmission power of the PUSCHs with UCI, and then allocates the remaining transmission power to the PRACHs.

If the physical uplink channel signals are PUCCH signals, that is, when the terminal equipment needs to transmit PRACH signals in an SCell and transmit PUCCH signals in a PCell within the same subframe, the terminal equipment first calculates the transmission power needed by the PUCCHs and the transmission power needed by the PRACHs according to above formulae (2) and (4) respectively. If the total transmission power thus obtained exceeds the maximum output power of the terminal equipment, according to what is predefined in this embodiment that the priority order of a PRACH signal is less than the priority order of a PUCCH signal, the terminal equipment first ensures satisfying the transmission power of the PUCCHs, and then allocates the remaining transmission power to the PRACHs.

For the case where there are two types of physical uplink channel signals.

If the physical uplink channel signals are PUSCH signals with no UCI and PUSCH signals with UCI, that is, when the terminal equipment needs to transmit PRACH signals in an SCell and transmit PUSCH signals with no UCI and PUSCH signals with UCI in a PCell or other SCell(s) within the same subframe, the terminal equipment first calculates the transmission power needed by the PUSCHs and the transmission power needed by the PRACHs according to above formulae (5) and (4) respectively. If the total transmission power thus obtained exceeds the maximum output power of the terminal equipment, according to what is predefined in this embodiment that the priority order of a PRACH signal is less than the priority order of a PUSCH signal with no UCI and the priority order of a PUSCH signal with no UCI is less than the priority order of a PUSCH signal with UCI, the terminal equipment first ensures satisfying the transmission power of the PUSCH signal with UCI, and then judges whether the remaining transmission power satisfies the transmission power of the PUSCH signal with no UCI; if yes, the terminal equipment satisfies the transmission power of the PUSCH signals with no UCI, and then allocates the remaining transmission power to the PRACHs; and if no, the terminal equipment sets the transmission power of the PRACHs to be 0, and allocates the remaining transmission power to all the PUSCHs with no UCI by an equal share.

If the physical uplink channel signals are PUSCH signals with no UCI and PUCCH signals, that is, when the terminal equipment needs to transmit PRACH signals in an SCell and transmit PUSCH signals with no UCI in a PCell or other SCell(s) and transmit PUCCH signals in a PCell within the same subframe, the terminal equipment first calculates the transmission power needed by the PUCCHs, the transmission power needed by the PUSCHs and the transmission power needed by the PRACHs according to above formulae (4), (5) and (7), or (4), (5) and (6), respectively. If the total transmission power thus obtained exceeds the maximum output power of the terminal equipment, according to what is predefined in this embodiment that the priority order of a PRACH signal is less than the priority order of a PUSCH signal with no UCI and the priority order of a PUSCH signal with no UCI is less than the priority order of a PUCCH signal, the terminal equipment first ensures satisfying the transmission power of the PUCCHs, and then judges whether the remaining transmission power satisfies the transmission power of the PUSCH signals with no UCI; if yes, the terminal equipment satisfies the transmission power of the PUSCH signals with no UCI, and then allocates the remaining transmission power to the PRACHs; and if no, the terminal equipment sets the transmission power of the PRACHs to be 0, and allocates the remaining transmission power to all the PUSCHs with no UCI by an equal share.

If the physical uplink channel signals are PUSCH signals with UCI and PUCCH signals, that is, when the terminal equipment needs to transmit PRACH signals in an SCell and transmit PUSCH signals with UCI in a PCell or other SCell(s) and transmit PUCCH signals in a PCell within the same subframe, the terminal equipment first calculates the transmission power needed by the PUCCHs, the transmission power needed by the PUSCHs and the transmission power needed by the PRACHs according to above formulae (4), (5) and (7), or (4), (5) and (6), respectively. If the total transmission power thus obtained exceeds the maximum output power of the terminal equipment, according to what is predefined in this embodiment that the priority order of a PRACH signal is less than the priority order of a PUSCH signal with UCI and the priority order of a PUSCH signal with UCI is less than the priority order of a PUCCH signal, the terminal equipment first ensures satisfying the transmission power of the PUCCH signals, and then judges whether the remaining transmission power satisfies the transmission power of the PUSCH signals with UCI; if yes, the terminal equipment satisfies the transmission power of the PUSCH signals with UCI, and then allocates the remaining transmission power to the PRACHs; and if no, the terminal equipment sets the transmission power of the PRACHs to be 0, and allocates the remaining transmission power to the PUSCHs with UCI.

For the case where there are three types of physical uplink channel signals.

If the physical uplink channel signals are PUSCH signals with no UCI, PUSCH signals with UCI and PUCCH signals, that is, when the terminal equipment needs to transmit PRACH signals in an SCell, transmit PUSCH signals with UCI and PUSCH signals with no UCI in a PCell or other SCell(s) and transmit PUCCH signals in a PCell within the same subframe, the terminal equipment first calculates the transmission power needed by the PUCCHs, the transmission power needed by the PUSCHs and the transmission power needed by the PRACHs according to above formulae (4), (5) and (7), or (4), (5) and (6), respectively. If the total transmission power thus obtained exceeds the maximum output power of the terminal equipment, according to what is predefined in this embodiment that the priority order of a PRACH signal is less than the priority order of a PUSCH signal with no UCI, the priority order of a PUSCH signal with no UCI is less than the priority order of a PUSCH signal with UCI and the priority order of a PUSCH signal with UCI is less than the priority order of a PUCCH signal, the terminal equipment first ensures satisfying the transmission power of the PUCCHs, and then judges whether the remaining transmission power satisfies the transmission power of the PUSCH signals with UCI; if the transmission power of the PUSCH signals with UCI cannot be satisfied, the terminal equipment sets the transmission power of the PRACHs and the transmission power of all the PUSCHs with no UCI to be 0, and at the same time, allocates the remaining transmission power to the PUSCHs with UCI; if the transmission power of the PUSCH signal with UCI can be satisfied, the terminal equipment satisfies the transmission power of the PUSCH signals with UCI, and then judges whether the remaining transmission power satisfies the transmission power of the PUSCH signals with no UCI. If the transmission power of the PUSCH signals with no UCI can be satisfied, the terminal equipment satisfies the transmission power of the PUSCH signals with no UCI, and then allocates the remaining transmission power to the PRACHs; and if the transmission power of the PUSCH signals with no UCI cannot be satisfied, the terminal equipment sets the transmission power of the PRACHs to be 0, and at the same time, allocates the remaining transmission power to all the PUSCHs with no UCI.

With the power control method of this embodiment, when the terminal equipment needs to transmit PRACH signals and SRS signals in different serving cells within the same OFDM symbol at the same time, if the total transmission power of the terminal equipment obtained through calculation is greater than the maximum output power of the terminal equipment, the terminal equipment adjusts the transmission power of a signal of relatively lower priority order, so as to ensure that the total transmission power is less than or equal to the maximum output power of the terminal equipment, thereby solving the problem that the total transmission power is greater than the configured maximum output power resulted from transmitting SRS signals and PRACH signals by the terminal equipment within the same OFDM symbol at the same time. Furthermore, when the terminal equipment needs to transmit PRACH signals in an SCell and transmit physical uplink channel signals in other cell(s) within the same subframe, if the total transmission power of the terminal equipment obtained through calculation is greater than the maximum output power of the terminal equipment, the terminal equipment may adjust the transmission power of a signal of relatively lower priority order according to the priority order of the PRACH signals and each physical uplink channel signal, so as to ensure that the total transmission power is less than or equal to the maximum output power of the terminal equipment, thereby providing a practical and feasible power control method for a scenario newly occurred in Rel-11 in which the power of the terminal equipment is limited.

An embodiment of the present invention further provides terminal equipment, as described in Embodiment 5 below. As the principle of the terminal equipment for solving problem is similar to that of the method in embodiments 1 and 2, the implementation of the method may be referred to for the implementation of the terminal equipment, and the repeated parts shall not be described any further.

Embodiment 5

Figure 11:
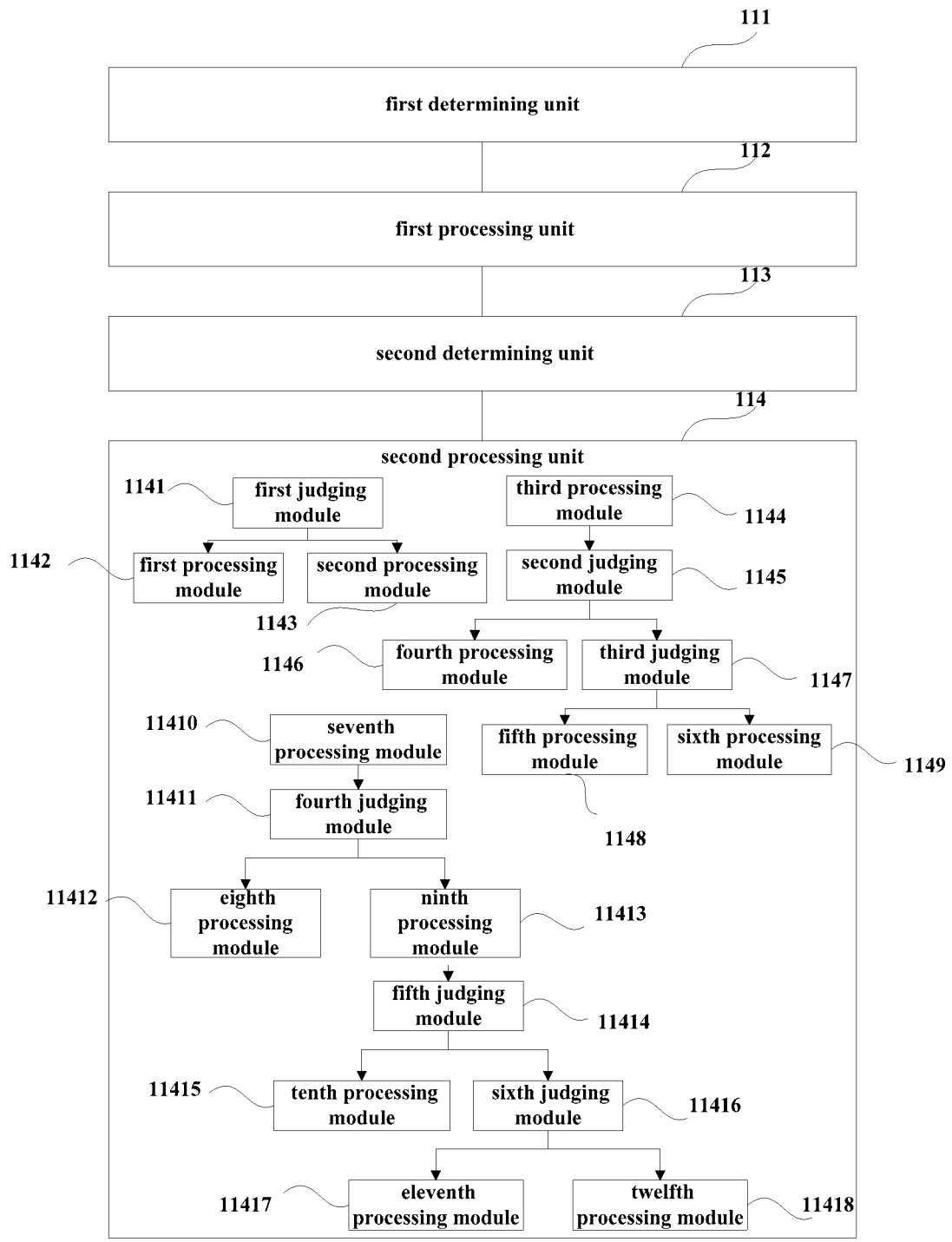
FIG. 11 is a schematic diagram of the structure of terminal equipment provided by an embodiment of the present invention.

FIG. 11 is a schematic diagram of the structure of terminal equipment provided by an embodiment of the present invention. Referring to FIG. 11, the terminal equipment includes:

a first determining unit 111 configured to determine whether the terminal equipment needs to transmit a PRACH signal in a secondary serving cell and transmit an uplink SRS signal in other serving cell(s) within the same OFDM symbol; and a first processing unit 112 configured to drop the SRS signal in the other serving cell(s) or puncture symbols of the PRACH signal in the secondary serving cell within the same OFDM symbol as the SRS signal in the other serving cell(s) if the determination result of the first determining unit 111 is positive.

In this embodiment, the terminal equipment further includes:

a second determining unit 113 configured to determine whether the terminal equipment needs to transmit a PRACH signal in a secondary serving cell and transmit a physical uplink channel signal in other serving cell(s) within the same subframe; and a second processing unit 114 configured to adjust the transmission power of the PRACH signal and/or the physical uplink channel signal according to a predefined priority order of the PRACH signal and the physical uplink channel signal when total transmission power is greater than maximum output power when it is determined positive by the second determining unit 113, until the adjusted total transmission power is less than or equal to the maximum output power of the terminal equipment.

In an implementation, there is one type of physical uplink channel signal, and the second processing unit 114 includes:

a first judging module 1141 configured to judge whether the priority order of the PRACH signal is the same as that of the physical uplink channel signal;

a first processing module 1142 configured to reduce the transmission power of the PRACH signal and the physical uplink channel signal by an equal share when the result of judgment of the first judging module 1141 is positive, until the adjusted total transmission power is less than or equal to the maximum output power of the terminal equipment; and a second processing module 1143 configured to satisfy first the transmission power of the signal with a higher priority order when the result of judgment of the first judging module 1141 is negative, and then reduce the transmission power of the signal with a lower priority order, until the adjusted total transmission power is less than or equal to the maximum output power of the terminal equipment.

In another implementation, there are two types of physical uplink channel signals, and the second processing unit 114 further includes:

a third processing module 1144 configured to satisfy the transmission power of the signal with a highest priority order;

a second judging module 1145 configured to judge whether the priority orders of the rest two signals are the same after the processing of the third processing module 1144;

a fourth processing module 1146 configured to reduce the transmission power of the rest two signals by an equal share when the result of judgment of the second judging module 1145 is positive, until the adjusted total transmission power is less than or equal to the maximum output power of the terminal equipment;

a third judging module 1147 configured to judge whether the rest transmission power satisfies the transmission power of the signal with a secondary priority order when the result of judgment of the second judging module 1145 is negative;

a fifth processing module 1148 configured to satisfy the transmission power of the signal with the secondary priority order when the result of judgment of the third judging module 1147 is positive, and reduce the transmission power of the signal with a lowest priority order, until the adjusted total transmission power is less than or equal to the maximum output power of the terminal equipment; and a sixth processing module 1149 configured to set the transmission power of the signal with the lowest priority order to be 0 when the result of judgment of the third judging module 1147 is negative, and allocate the rest transmission power to the signal with the secondary priority order.

In still another implementation, there are three types of physical uplink channel signals, and the second processing unit 114 includes:

a seventh processing module 11410 configured to satisfy the transmission power of the signal with a highest priority order;

a fourth judging module 11411 configured to judge whether the transmission power of the signal with a secondary priority order can be satisfied after the processing of the seventh processing module 11410;

an eighth processing module 11412 configured to allocate the rest transmission power to the signal with a secondary priority order when the result of judgment of the fourth judging module 11411 is negative, and set the transmission power of other signals to be 0;

a ninth processing module 11413 configured to satisfy the transmission power of the signal with the secondary priority order when the result of judgment of the fourth judging module 11411 is positive;

a fifth judging module 11414 configured to judge whether the priority orders of the rest two signals are the same after the processing of the ninth processing module 11413;

a tenth processing module 11415 configured to reduce the transmission power of the rest two signals by an equal share when the result of judgment of the fifth judging module 11414 is positive, until the adjusted total transmission power is less than or equal to the maximum output power of the terminal equipment;

a sixth judging module 11416 configured to judge whether the rest transmission power satisfies the transmission power of the signal with a relatively higher priority order of the two rest signals when the result of judgment of the fifth judging module 11414 is negative;

an eleventh processing module 11417 configured to satisfy the transmission power of the signal with the relatively higher priority order when the result of judgment of the sixth judging module 11416 is positive, and reduce the transmission power of the signal with a lowest priority order, until the adjusted total transmission power is less than or equal to the maximum output power of the terminal equipment; and a twelfth processing module 11418 configured to set the transmission power of the signal with the lowest priority order to be 0 when the result of judgment of the sixth judging module 11416 is negative, and allocate the rest transmission power to the signal with the relatively higher priority order.

In this embodiment, the physical uplink channel signal may include any combination of the following signals: a PUCCH signal, a PUSCH signal with UCI, and a PUSCH with no UCI. Wherein, the priority orders of the PRACH signal, the PUCCH signal, the PUSCH signal with UCI and the PUSCH with no UCI may be predefined as: the priority order of the PUSCH signal with no UCI is less than or equal to that of the PRACH signal, the priority order of the PRACH signal is less than that of the PUSCH signal with UCI, and the priority order of the PUSCH signal with UCI is less than that of the PUCCH signal.

With the terminal equipment of this embodiment, when it is needed to transmit PRACH signals and SRS signals in different serving cells within the same OFDM symbol at the same time, the transmission power of the terminal equipment is lowered by dropping the SRS signals and transmitting only the PRACH signals, or by puncturing the PRACH signals in the same OFDM symbol as the SRS signals and transmitting only the SRS signals, and the problem that the total transmission power is greater than the configured maximum output power resulted from transmitting SRS signals and PRACH signals by the terminal equipment in the same OFDM symbol at the same time is solved. Furthermore, when it is needed to transmit PRACH signals in an SCell and transmit physical uplink channel signals in other cell(s) within the same subframe, the terminal equipment may determine a power control policy according to the priority orders of the PRACH signals and each physical uplink channel signal, so as to ensure that the total transmission power is less than or equal to the maximum output power of the terminal equipment, thereby providing a practical and feasible power control method for a scenario newly occurred in Rel-11 in which the power of the terminal equipment is limited.

An embodiment of the present invention further provides terminal equipment, as described in Embodiment 6 below. As the principle of the terminal equipment for solving problem is similar to that of the method in embodiments 3 and 4, the implementation of the method in embodiments 3 and 4 may be referred to for the implementation of the terminal equipment, and the repeated parts shall not be described any further.

Embodiment 6

Figure 12:
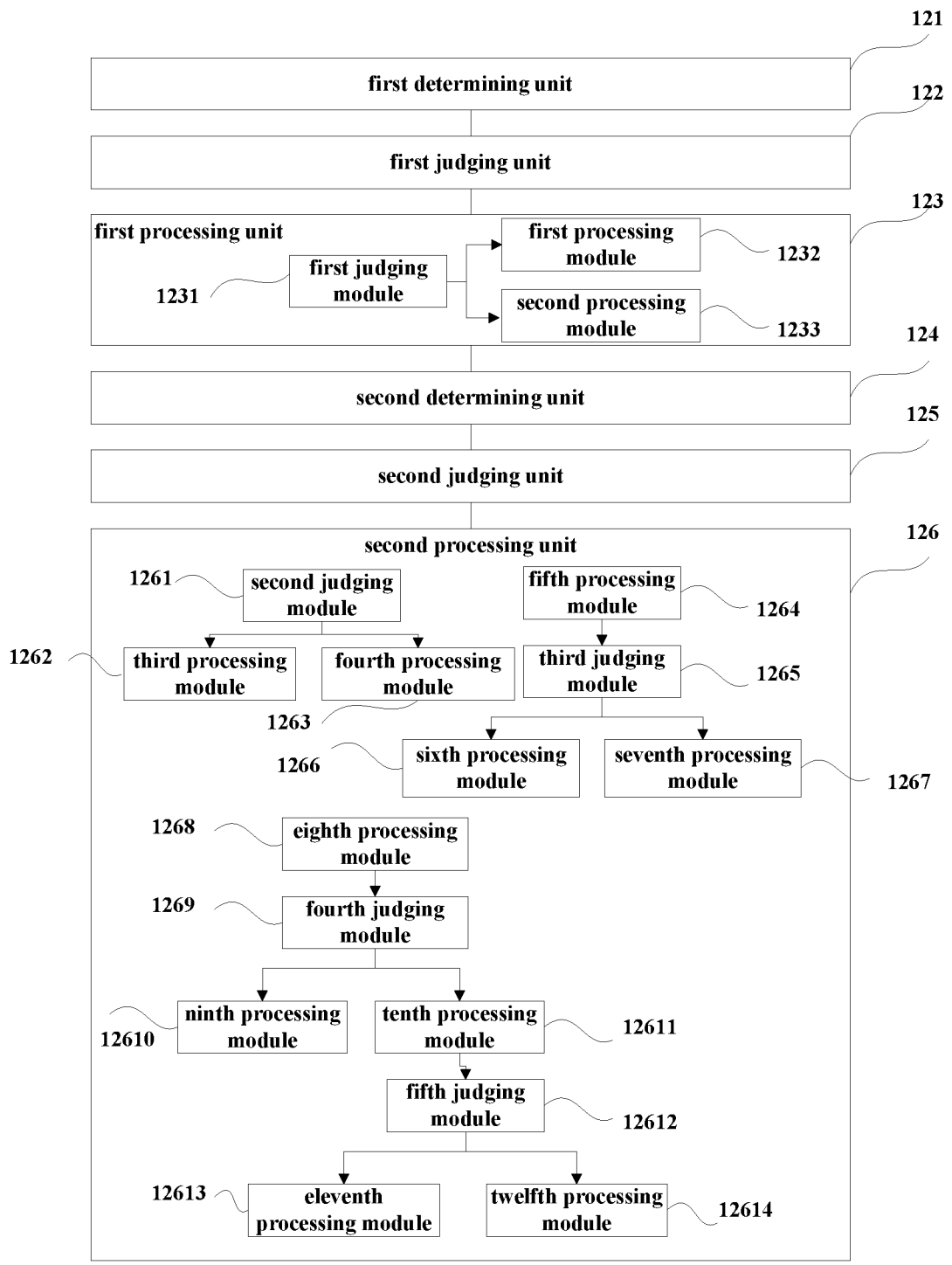
FIG. 12 is a schematic diagram of the structure of terminal equipment provided by another embodiment of the present invention.

FIG. 12 is a schematic diagram of the structure of terminal equipment provided by an embodiment of the present invention. Referring to FIG. 12, the terminal equipment includes:

a first determining unit 121 configured to determine whether the terminal equipment needs to transmit a PRACH signal in a secondary serving cell and transmit an uplink SRS signal in other serving cell(s) within the same OFDM symbol;

a first judging unit 122 configured to judge whether total transmission power is greater than maximum output power of the terminal equipment when it is determined positive by the first determining unit 121; and a first processing unit 123 configured to adjust the transmission power of the PRACH signal and the SRS signal according to the priority orders of the PRACH signal and the SRS signal when the result of judgment of the first judging unit 122 is positive.

In an embodiment, the first processing unit 123 includes:

a first judging module 1231 configured to judge whether the maximum output power of the terminal equipment satisfies the transmission power of the SRS signal;

a first processing module 1232 configured to satisfy the transmission power of the SRS signal when the result of judgment of the first judging module 1231 is positive, and allocate the rest transmission power to the PRACH signal; and a second processing module 1233 configured to set the transmission power of the PRACH signal to be 0 when the result of judgment of the first judging module 1231 is negative, and allocate the maximum output power to all the SRS signals by an equal share.

In this embodiment, the terminal equipment further includes:

a second determining unit 124 configured to determine whether the terminal equipment needs to transmit a PRACH signal in a secondary serving cell and transmit a physical uplink channel signal in other serving cell(s) within the same subframe;

a second judging unit 125 configured to judge whether the total transmission power is greater than the maximum output power of the terminal equipment when it is determined positive by the second determining unit 124; and a second processing unit 126 configured to adjust the transmission power of the PRACH signal or adjust the transmission power of the PRACH signal and the physical uplink channel signal according to predefined priority orders of the PRACH signal and the physical uplink channel signal when it is determined positive by the second judging unit 125, until the adjusted total transmission power is less than or equal to the maximum output power of the terminal equipment.

In an embodiment, there is one type of physical uplink channel signal, and the second processing unit 126 includes:

a second judging module 1261 configured to judge whether the maximum output power of the terminal equipment satisfies the transmission power of the signal with a higher priority order;

a third processing module 1262 configured to satisfy the transmission power of the signal with the higher priority order when the result of judgment of the second judging module 1261 is positive, and allocate the rest transmission power to the signal with a lower priority order; and a fourth processing module 1263 configured to set the transmission power of the signal with the lower priority order to be 0 when the result of judgment of the second judging module 1261 is negative, and allocate the rest transmission power to the signal with the higher priority order.

In another embodiment, there are two types of physical uplink channel signals, and the second processing unit 126 includes:

a fifth processing module 1264 configured to satisfy the transmission power of the signal with a highest priority order;

a third judging module 1265 configured to judge whether the rest transmission power satisfies the transmission power of the signal with a secondary priority order after the processing of the fifth processing module 1264;

a sixth processing module 1266 configured to satisfy the transmission power of the signal with a secondary priority order when the result of judgment of the third judging module 1265 is positive, and then allocate the rest transmission power to the signal with a lowest priority order; and a seventh processing module 1267 configured to set the transmission power of the signal with the lowest priority order to be 0 when the result of judgment of the third judging module 1265 is negative, and allocate the rest transmission power to the signal with the secondary priority order.

In still another embodiment, there are three types of physical uplink channel signals, and the second processing unit 126 includes:

an eighth processing module 1268 configured to satisfy the transmission power of the signal with a highest priority order;

a fourth judging module 1269 configured to judge whether the rest transmission power satisfies the transmission power of the signal with a secondary priority order after the processing of the eighth processing module 1268;

a ninth processing module 12610 configured to allocate the rest transmission power to the signal with the secondary priority order when the result of judgment of the fourth judging module 1269 is negative, and set the transmission power of the rest signals to be 0;

a tenth processing module 12611 configured to satisfy the transmission power of the signal with the secondary priority order when the result of judgment of the fourth judging module 1269 is positive;

a fifth judging module 12612 configured to judge whether the rest transmission power satisfies the signal with a third priority order after the processing of the tenth processing module 12611;

an eleventh processing module 12613 configured to satisfy the transmission power of the signal with the third priority order when the result of judgment of the fifth judging module 12612 is positive, and then allocate the rest transmission power to the signal with a lowest priority order; and a twelfth processing module 12614 configured to set the transmission power of the signal with the lowest priority order to be 0 when the result of judgment of the fifth judging module 12612 is negative, and allocate the rest transmission power to the signal with the third priority order.

In this embodiment, the physical uplink channel signal may include any combination of the following signals: a PUCCH signal, a PUSCH signal with UCI, and a PUSCH with no UCI. Wherein, the priority orders of the PRACH signal, the PUCCH signal, the PUSCH signal with UCI and the PUSCH with no UCI may be predefined as: the priority order of the PRACH signal is less than that of the PUSCH signal with no UCI, the priority order of the PUSCH signal with no UCI is less than that of the PUSCH signal with UCI, and the priority order of the PUSCH signal with UCI is less than that of the PUCCH signal.

With the terminal equipment of this embodiment, when it is needed to transmit PRACH signals and SRS signals in different serving cells within the same OFDM symbol at the same time, the terminal equipment lowers the transmission power of the signal of relatively lower priority order, so as to ensure that the total transmission power is less than or equal to the maximum output power of the terminal equipment, thereby solving the problem that the total transmission power is greater than the configured maximum output power resulted from transmitting SRS signals and PRACH signals by the terminal equipment in the same OFDM at the same time. Furthermore, when it is needed to transmit PRACH signals in an SCell and transmit physical uplink channel signals in other cell(s) within the same subframe, the terminal equipment may determine a power control policy according to the priority orders of the PRACH signals and each physical uplink channel signal, so as to ensure that the total transmission power is less than or equal to the maximum output power of the terminal equipment, thereby providing a practical and feasible power control method for a scenario newly occurred in Rel-11 in which the power of the terminal equipment is limited.

An embodiment of the present invention further provides a computer-readable program, wherein when the program is executed in terminal equipment, the program enables a computer to carry out the power control method as described in embodiments 1-4 in the terminal equipment.

An embodiment of the present invention further provides a storage medium in which a computer-readable program is stored, wherein the computer-readable program enables a computer to carry out the power control method as described in embodiments 1-4 in terminal equipment.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A user equipment comprising:
 a processor circuit configured to:
 perform a transmission power control according to Physical Random Access Channel (PRACH) signal, Physical uplink channel signal and uplink reference signal so that the total transmission power is less than or equal to the maximum output power for the user equipment; and
 transmit the PRACH signal or Physical uplink channel signal.

2. The user equipment according to claim 1, wherein the transmission power control is performed to satisfy the transmission power of signal of higher priority order.

3. The user equipment according to claim 1, wherein the Physical uplink channel is Physical Uplink Shared Channel (PUSCH), a priority order is predefined, the priority order of a PUSCH transmission with UCI is less than that of PUSCH transmission with no UCI.

4. The user equipment according to claim 1, wherein the Physical uplink channel is Physical Uplink Shared Channel (PUSCH), a PUSCH transmission includes to transmit PUSCH signal.

* * * * *